United States Patent
Watanabe

(10) Patent No.: US 9,592,796 B2
(45) Date of Patent: Mar. 14, 2017

(54) HVAC DEVICE FOR A VEHICLE

(71) Applicant: Takumasa Watanabe, Kanagawa (JP)

(72) Inventor: Takumasa Watanabe, Kanagawa (JP)

(73) Assignee: YOKOHAMA HEAT USE TECHNLOGY, Kanagawa (JP)

( * ) Notice: Subject to any disclaimer, the term of this patent is extended or adjusted under 35 U.S.C. 154(b) by 510 days.

(21) Appl. No.: 14/128,548

(22) PCT Filed: Nov. 14, 2012

(86) PCT No.: PCT/JP2012/079534
§ 371 (c)(1),
(2) Date: Dec. 20, 2013

(87) PCT Pub. No.: WO2014/024332
PCT Pub. Date: Feb. 13, 2014

(65) Prior Publication Data
US 2014/0338883 A1    Nov. 20, 2014

(30) Foreign Application Priority Data
Aug. 5, 2012 (JP) .................. 2012-173502

(51) Int. Cl.
*F24F 3/14* (2006.01)
*F24F 11/08* (2006.01)
(Continued)

(52) U.S. Cl.
CPC .......... *B60S 1/026* (2013.01); *B01D 53/0407* (2013.01); *B60H 3/024* (2013.01); *B60S 1/54* (2013.01); *B60H 2003/028* (2013.01)

(58) Field of Classification Search
CPC . B60S 1/026; B60S 1/54; B60H 3/024; B60H 2003/028; B01D 53/0407
(Continued)

(56) References Cited

U.S. PATENT DOCUMENTS 2,085,964 A * 7/1937 Fonda .................. F24F 3/14
165/222
3,035,418 A * 5/1962 Wright .................. E03B 3/28
62/173
(Continued)

FOREIGN PATENT DOCUMENTS

CN    59-222211    12/1984
JP    05-270252    10/1993
(Continued)

OTHER PUBLICATIONS

Japanese Office Action (Dispatch No. 387680; Dispatch Date: Aug. 30, 2016; JP patent application No. 2014-529238).
(Continued)

*Primary Examiner* — Ljiljana Ciric
(74) *Attorney, Agent, or Firm* — Steptoe & Johnson LLP

(57) ABSTRACT

An HVAC device including a compressor and a first blower disposed along ventilation pipes for taking in interior air of the vehicle through a duct in communication with the first blower. An evaporator and dehumidifying member may be disposed along the ventilation pipes and in communication with the first blower. The device includes a condenser and an electrical heating unit disposed along the ventilation pipes and in communication with the first blower, and a vehicle interior air reflux duct disposed along the ventilation pipes and in communication with first blower and the interior of the vehicle. A second blower disposed along the ventilation pipes for taking in air outside of the vehicle through another duct, and a first exhaust duct and a second exhaust duct disposed along the ventilation pipes and in communication with the second blower. The device includes several modes for creating different flow paths through the vehicle.

3 Claims, 13 Drawing Sheets

(51) Int. Cl.
    *B60S 1/02*   (2006.01)
    *B60H 3/02*   (2006.01)
    *B01D 53/04*  (2006.01)
    *B60S 1/54*   (2006.01)

(58) Field of Classification Search
    USPC .................................... 62/176.1; 236/44 A
    See application file for complete search history.

(56) References Cited

U.S. PATENT DOCUMENTS

| | | | | |
|---|---|---|---|---|
| 3,444,092 A * | 5/1969 | Truhan | ............... | G01N 33/48 |
| | | | | 236/44 R |
| 3,938,348 A * | 2/1976 | Rickert | ............... | F24F 1/027 |
| | | | | 62/122 |
| 3,945,217 A * | 3/1976 | Bashark | ............ | F25D 21/002 |
| | | | | 338/35 |
| 4,142,574 A * | 3/1979 | Shavit | ............... | F24F 11/08 |
| | | | | 165/208 |
| 4,153,434 A * | 5/1979 | Settlemyer | ........... | B01D 53/26 |
| | | | | 62/176.1 |
| 4,414,818 A * | 11/1983 | Turbard | ............. | A01G 9/246 |
| | | | | 237/2 B |
| 4,428,207 A * | 1/1984 | Hall | ................. | F24F 3/153 |
| | | | | 236/44 R |
| 4,453,591 A * | 6/1984 | Fehr | ............... | B60H 1/00064 |
| | | | | 165/202 |
| 4,460,122 A * | 7/1984 | Jardinier | ............ | F24F 7/007 |
| | | | | 165/222 |
| 4,526,011 A * | 7/1985 | Logan | ............. | G05D 23/1393 |
| | | | | 340/602 |
| 4,735,054 A * | 4/1988 | Beckey | ............. | F24F 11/085 |
| | | | | 62/176.1 |
| 4,801,308 A * | 1/1989 | Keefer | ............. | B01D 53/04 |
| | | | | 422/217 |
| 4,959,970 A * | 10/1990 | Meckler | ............. | F02G 1/043 |
| | | | | 454/236 |
| 4,987,748 A * | 1/1991 | Meckler | ............. | F02G 1/043 |
| | | | | 62/176.1 |
| 5,072,597 A * | 12/1991 | Bromley | ............. | B60H 1/3207 |
| | | | | 236/91 C |
| 5,096,549 A * | 3/1992 | Yamauchi | ........... | B01D 53/26 |
| | | | | 204/229.2 |
| 5,170,637 A * | 12/1992 | Shyu | ............... | F24F 3/12 |
| | | | | 204/242 |
| 5,181,387 A * | 1/1993 | Meckler | ............. | F02G 1/043 |
| | | | | 62/176.1 |
| 5,230,466 A * | 7/1993 | Moriya | ............. | G05D 22/02 |
| | | | | 236/44 A |
| 5,435,146 A * | 7/1995 | Clark | ............... | F24F 11/0008 |
| | | | | 374/28 |
| 5,528,905 A * | 6/1996 | Scarlatti | ............ | B01D 53/229 |
| | | | | 165/229 |
| 5,560,217 A | 10/1996 | Takahashi et al. | | |
| 5,697,223 A | 12/1997 | Ishii et al. | | |
| 5,887,784 A * | 3/1999 | Haas | ............... | F24F 3/1423 |
| | | | | 236/44 A |
| 6,170,271 B1 * | 1/2001 | Sullivan | ........... | F24F 3/153 |
| | | | | 62/176.1 |
| 6,223,545 B1 * | 5/2001 | Kinkel | ............. | F24F 1/022 |
| | | | | 165/224 |
| 6,427,454 B1 * | 8/2002 | West | ............... | F24F 3/153 |
| | | | | 62/176.1 |
| 6,447,826 B1 * | 9/2002 | Matthews | ........... | A23B 4/16 |
| | | | | 426/126 |
| 6,763,677 B1 * | 7/2004 | Burchill | ............ | F24F 13/12 |
| | | | | 62/129 |
| 6,945,402 B1 * | 9/2005 | Gueret | ............. | B65D 81/3272 |
| | | | | 206/219 |
| 7,096,684 B2 * | 8/2006 | Yabu | ............... | B01D 53/261 |
| | | | | 62/176.1 |
| 7,222,666 B2 * | 5/2007 | Homan | ............ | B60H 1/3207 |
| | | | | 165/202 |
| 7,337,622 B2 * | 3/2008 | Wang | ............... | B60H 1/00785 |
| | | | | 165/222 |
| 7,386,988 B1 * | 6/2008 | Petschauer | ........... | F24F 5/0071 |
| | | | | 236/44 R |
| 7,472,553 B2 * | 1/2009 | Ikegami | ............. | B01D 53/265 |
| | | | | 62/176.1 |
| 7,484,381 B2 * | 2/2009 | Lattanzio | ............ | F24F 3/1423 |
| | | | | 165/4 |
| 7,591,881 B2 * | 9/2009 | Yeager | ............. | B01D 53/261 |
| | | | | 206/204 |
| 7,810,342 B2 * | 10/2010 | Matsui | ............. | B01D 53/261 |
| | | | | 62/160 |
| 7,874,499 B2 * | 1/2011 | Lochtefeld | ........... | F24F 3/06 |
| | | | | 236/44 C |
| 7,946,122 B2 * | 5/2011 | Kim | ................. | F24F 1/027 |
| | | | | 62/176.1 |
| 8,029,893 B2 * | 10/2011 | Siegel | ............. | 428/34.1 |
| 8,047,014 B2 * | 11/2011 | Yabu | ............... | F24F 3/1411 |
| | | | | 236/44 A |
| 8,069,681 B1 * | 12/2011 | Cink | ............... | F24F 3/1405 |
| | | | | 62/176.1 |
| 8,769,978 B2 * | 7/2014 | Nakaguro | ........... | B60H 3/024 |
| | | | | 236/44 A |
| 8,985,474 B2 * | 3/2015 | MacCallum | ........... | B01D 53/22 |
| | | | | 236/44 A |
| 9,021,821 B2 * | 5/2015 | Dunnavant | ........... | F24F 3/14 |
| | | | | 62/176.1 |
| 9,463,683 B2 * | 10/2016 | Watanabe | ........... | B01D 53/261 |
| 2001/0023593 A1 * | 9/2001 | Sato | ............... | F24F 1/0007 |
| | | | | 62/176.1 |
| 2003/0044492 A1 * | 3/2003 | Knigge | ............. | B65D 31/02 |
| | | | | 426/124 |
| 2003/0221820 A1 * | 12/2003 | Drucker | ............. | B60H 1/00335 |
| | | | | 165/202 |
| 2003/0235664 A1 * | 12/2003 | Merical | ............. | B32B 7/06 |
| | | | | 428/35.7 |
| 2004/0058637 A1 * | 3/2004 | Laiti | ............... | B01D 46/0028 |
| | | | | 454/229 |
| 2004/0089002 A1 * | 5/2004 | Rayburn | ............. | F24F 3/153 |
| | | | | 62/176.1 |
| 2004/0089015 A1 * | 5/2004 | Knight | ............. | F24F 3/153 |
| | | | | 62/324.1 |
| 2004/0118133 A1 * | 6/2004 | Maeda | ............. | F24F 3/1405 |
| | | | | 62/93 |
| 2004/0137202 A1 * | 7/2004 | Hamilton | ........... | B65D 65/14 |
| | | | | 428/174 |
| 2005/0016189 A1 * | 1/2005 | Wacker | ............. | G05D 22/02 |
| | | | | 62/93 |
| 2005/0022541 A1 * | 2/2005 | Rayburn | ............. | F24F 3/153 |
| | | | | 62/176.1 |
| 2005/0230096 A1 * | 10/2005 | Yamaoka | ........... | B60H 1/03 |
| | | | | 165/202 |
| 2006/0026976 A1 * | 2/2006 | Carpenter | ............ | F24F 11/0008 |
| | | | | 62/176.1 |
| 2006/0026977 A1 * | 2/2006 | Mitter | ............. | G05D 22/02 |
| | | | | 62/176.1 |
| 2006/0117781 A1 * | 6/2006 | Moffitt | ............. | F24F 3/1423 |
| | | | | 62/271 |
| 2007/0144189 A1 * | 6/2007 | Ishida | ............. | F24F 3/1411 |
| | | | | 62/157 |
| 2007/0151280 A1 * | 7/2007 | Wiggs | ............. | F24F 3/14 |
| | | | | 62/324.1 |
| 2007/0163279 A1 * | 7/2007 | Moffitt | ............. | F24F 3/1423 |
| | | | | 62/271 |
| 2007/0175227 A1 * | 8/2007 | Knight | ............. | F24F 3/153 |
| | | | | 62/176.1 |
| 2007/0193287 A1 * | 8/2007 | Ishida | ............. | F24F 3/1411 |
| | | | | 62/176.1 |
| 2007/0261422 A1 * | 11/2007 | Crawford | ........... | F24F 11/0008 |
| | | | | 62/176.1 |
| 2007/0277540 A1 * | 12/2007 | Fernandes | ........... | F24F 3/153 |
| | | | | 62/176.1 |
| 2008/0078842 A1 * | 4/2008 | MacDonald | ........... | F24F 3/1405 |
| | | | | 236/44 R |
| 2008/0173438 A1 * | 7/2008 | Haglid | ............. | F24F 3/1405 |
| | | | | 165/223 |

(56) References Cited

U.S. PATENT DOCUMENTS

| | | | |
|---|---|---|---|
| 2009/0210095 A1* | 8/2009 | Bush | F24F 11/0015 700/277 |
| 2009/0223233 A1* | 9/2009 | Taras | F24F 3/153 62/93 |
| 2010/0022177 A1* | 1/2010 | Hidaka | B60H 1/00478 454/156 |
| 2010/0031680 A1* | 2/2010 | Eisenhour | B60H 1/3207 62/176.1 |
| 2010/0107673 A1 | 5/2010 | Nakaguro et al. | |
| 2010/0212334 A1* | 8/2010 | DeMonte | F24F 1/04 62/93 |
| 2011/0042836 A1* | 2/2011 | Zhang | F02C 7/04 261/101 |
| 2011/0056384 A1* | 3/2011 | Kadota | F24F 3/1417 96/407 |
| 2011/0083458 A1* | 4/2011 | Takakura | B01D 53/0454 62/176.1 |
| 2011/0088417 A1* | 4/2011 | Kayser | F24F 3/1423 62/94 |
| 2011/0101117 A1* | 5/2011 | Miyauchi | B01D 53/1425 236/44 A |
| 2011/0289944 A1* | 12/2011 | Ouyang | B60H 1/00328 62/61 |
| 2012/0036733 A1* | 2/2012 | Dehn | A61F 13/00008 34/282 |
| 2012/0096883 A1* | 4/2012 | Tavsan | A01G 9/246 62/185 |
| 2012/0241127 A1 | 9/2012 | Watanabe | |
| 2013/0167571 A1* | 7/2013 | Nakagawa | F24F 11/0008 62/176.4 |
| 2014/0166765 A1* | 6/2014 | Takahashi | F24F 3/1405 236/44 A |

FOREIGN PATENT DOCUMENTS

| | | |
|---|---|---|
| JP | 07-266860 | 10/1995 |
| JP | 08-067136 | 3/1996 |
| JP | 08-169231 | 7/1996 |
| JP | 09-122433 | 5/1997 |
| JP | 2006-264490 | 10/2006 |
| JP | 2008-247305 | 10/2008 |
| JP | 2008-302874 | 12/2008 |
| JP | 2009-154862 | 7/2009 |
| JP | 2010-121921 | 6/2010 |
| JP | 2011-121516 | 6/2011 |

OTHER PUBLICATIONS

Partial translation of the Japanese Office Action (Dispatch No. 387680; Dispatch Date: Aug. 30, 2016; JP patent application No. 2014-529238).

\* cited by examiner

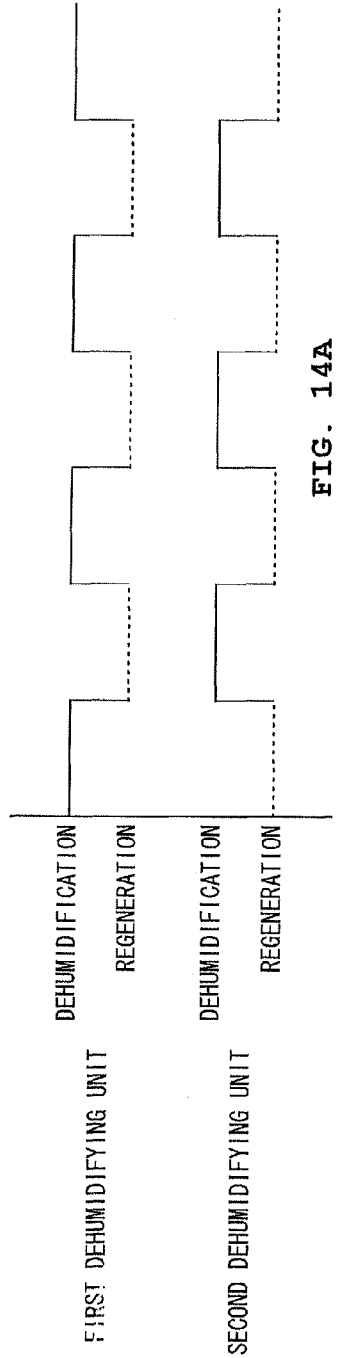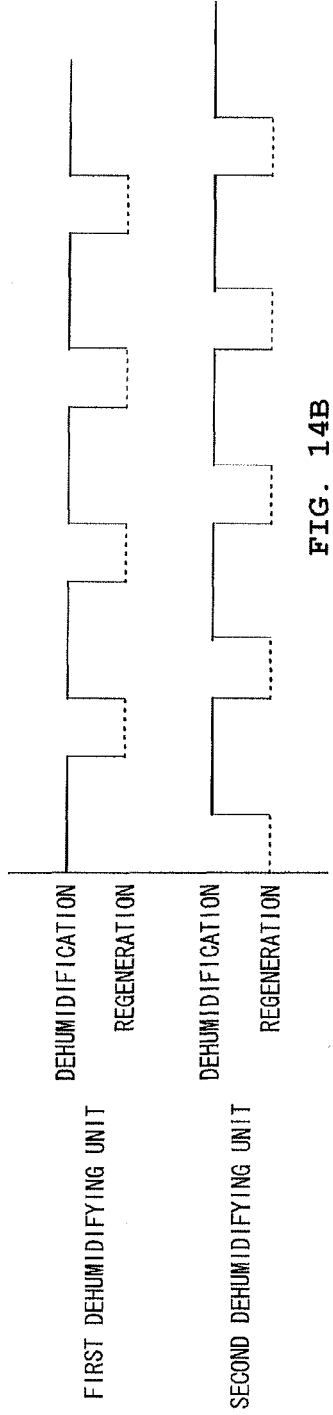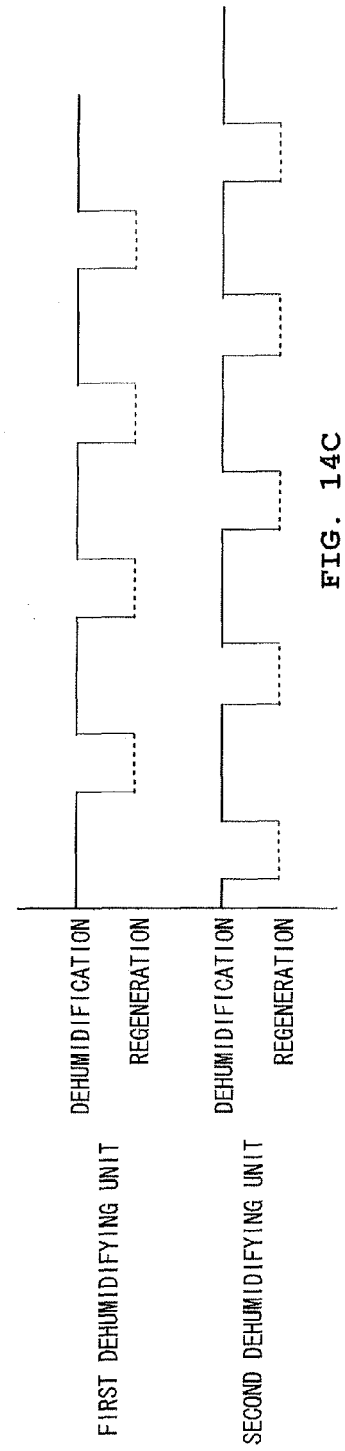

HVAC DEVICE FOR A VEHICLE

CROSS-REFERENCE TO RELATED APPLICATIONS

This application claims priority to International Application No. PCT/JP2012/079534, filed Nov. 14, 2012, which claims priority to Japanese Patent Application No. 2012-173502, filed Aug. 5, 2012, each of which are incorporated by reference in their entirety.

TECHNICAL FIELD

The present invention relates to HVAC (Heating, Ventilating and Air Conditioning) device, and more particularly, to an HVAC device for a vehicle, such as an HVAC device mounted on an electric vehicle, a hybrid vehicle, a plug-in hybrid vehicle, a fuel cell vehicle, a maglev train, or the like (hereinafter simply referred to as "electric vehicle or the like"). Further, the present invention relates to an HVAC device that is provided to prevent dew condensation (fogging) of a window of a vehicle, such as a windshield of an electric vehicle or the like, and performs heating and cooling of a vehicle interior.

BACKGROUND

Hitherto, from the viewpoint of cost saving and energy saving, there has been a demand for reducing the amount of energy consumption in an HVAC device. In particular, when the HVAC device is driven by a battery, efficient air conditioning with small power consumption is demanded in order to use a small capacity battery.

Further, in recent years, in order to reduce the emission amount of carbon dioxide that is a greenhouse gas generated along with the use of fossil fuels, efforts have been made to introduce vehicles which use no fossil fuel during running, such as an electric vehicle, a hybrid vehicle using fossil fuel and a battery as a vehicle drive source to drastically improve the fuel efficiency, or a plug-in hybrid vehicle.

However, sales of such electric vehicles are currently far from strong, and are rather sluggish.

Taking the electric vehicle as an example, one of the major reasons for the sluggish sales is significant dissatisfaction with winter use from automobile users. This derives from a drawback that, when the vehicle interior is heated and the visibility of a window is secured (anti-fogging is performed) during driving in winter when outside air temperature decreases, the cruising distance is drastically decreased.

For example, there are reports that, in a case where the vehicle is driven while the interior thereof is maintained at about 25° C. when the outside air temperature is 0° C., the cruising distance decreases by about 30% as compared to the case where air conditioning and anti-fogging are not performed, and when the outside air temperature is −10° C., the cruising distance decreases by half. The consumption of energy from the battery increases in winter as described above due to adoption of a system in which low-humidity and low-temperature outside air is introduced inside the vehicle for the purpose of anti-fogging, and the introduced air is heated for heating the interior. Fogging on the glass window is mainly caused by water vapor (insensible perspiration) contained in the breath of an occupant. The amount of this water vapor is 30 to 50 g/h per adult male. If this water vapor amount can be absorbed by a dehumidifying member (desiccant), fogging on the window can be prevented.

For example, in a case where the outside air temperature is lower than the vehicle interior temperature, when electric power from an in-vehicle battery is used for heating the vehicle interior or preventing dew condensation on a glass window, the cruising distance is decreased. This cruising distance decrease phenomenon in cold weather is mainly caused by introducing low-humidity outside air from the necessity of maintaining low vehicle interior air humidity for the purpose of preventing fogging on the window during running (safety reasons), and then heating the introduced air by the electric power from the in-vehicle battery for vehicle interior heating.

Further, a compression refrigerating machine is used for vehicle interior cooling. Ina case where a dew-point temperature of the air to be processed is higher than the target room temperature, dew condensation occurs from the air to be processed when the air to be processed is cooled down to the dew-point temperature or less. Therefore, a load on the compression refrigerating machine increases, and the refrigeration efficiency in cooling down to a low temperature reduces, which leads to increase in amount of power consumption. As a result, there arise problems in that the amount of power consumption in the in-vehicle battery increases, and the cruising distance decreases.

In order to solve those problems, a measure of increasing the capacity of the battery to be mounted on the vehicle is taken to secure the cruising distance per one charging, but such a measure may lead to increase in vehicle weight and battery cost. In order to solve such problems, it is effective to realize cooling and heating without depending on much power supply from the mounted battery, or performing anti-fogging on a window with low power consumption or reducing water vapor condensation latent heat load during vehicle interior cooling.

For example, when three occupants get in a vehicle having a space with an air weight of 4.8 kg under conditions of an outside temperature of 5° C. and a relative humidity of 60% (absolute humidity of 2.6 g/kg), the amount of insensible perspiration (exuded amount of water vapor) of a human is about 30 g/h per person, and hence the absolute humidity of the vehicle interior air increases at a rate of 18.8 g/h per air of 1 kg. Therefore, dew condensation occurs on a glass window as the air temperature comes close to 5° C. in the vicinity of the glass window. The saturation water vapor amount of 5° C. air is 5.4 g per air of 1 kg. Therefore, it takes about 9 minutes at the latest from the start of driving until the relative humidity reaches 100% and the glass window starts to fog.

As measures for preventing dew condensation (fogging) on the window or the like, in recent years, there has been proposed a desiccant air conditioning technology that uses a dehumidifying member for an HVAC device for an automobile. The desiccant air conditioning technology utilizes the moisture absorbing action of the dehumidifying member. The dehumidifying member that has absorbed a certain amount of moisture needs to be regenerated by low-relative-humidity and high-temperature air. For example, Patent Literature 1 describes an air conditioning system for an electric vehicle which uses warm air from an in-vehicle heat pump to regenerate a ventilation rotor carrying the dehumidifying member.

Patent Literature 2 describes an air conditioning system in which a moisture-absorbing container containing the dehumidifying member is placed in the air conditioning system for an automobile for the purpose of reducing the load of dehumidification of the air to be processed, to thereby reduce the load of the compression refrigerating machine for cooling/dehumidification.

Further, Patent Literature 3 describes an air conditioning system which uses heat storage to additionally performs hot water production during charging of the in-vehicle battery in order to reduce the load of electric power in heating of the electric vehicle.

Further, for example, Patent Literature 4 describes a technology of arranging a dehumidifying unit including a dehumidifying member inside the vehicle to absorb water vapor exuded from an occupant by the dehumidifying member during running, to thereby prevent fogging on the window.

CITATION LIST

Patent Literature

[PTL 1] JP 2009-154862 A
[PTL 2] JP 08-67136 A
[PTL 3] JP 05-270252 A
[PTL 4] JP 4801197 B

However, there are still problems to be solved in air conditioning and dehumidification of the vehicle. The air conditioning system for an electric vehicle described in Patent Literature 1 uses the following configuration. A flow path for air passing through the ventilation rotor carrying the dehumidifying member is divided into two flow paths. Air to be processed is dehumidified in one of the flow paths, and air passing through the other flow path is heated by the in-vehicle heat pump and then caused to pass through the ventilation rotor, to thereby regenerate the dehumidifying member.

Therefore, the following problems arise. The device requires a device for rotating the ventilation rotor that is provided across the flow paths for the air to be processed and the regeneration air, and also requires a seal for preventing mixture of the air flowing through the two flow paths. Therefore, the entire device is complicated and upsized. Further, in a case where the outside air temperature decreases, the warm air producing performance of the heat pump decreases, and hence the dehumidifying member may not be sufficiently regenerated, which may require additional air heating by power supply from the in-vehicle battery.

In the air conditioning system for an automobile described in Patent Literature 2, the dehumidifying member is regenerated with use of electric power from the in-vehicle battery, or electric power from an in-vehicle power generator. Therefore, the system is ineffective as a measure against reduction in cruising distance of the electric vehicle or the like.

The air conditioning system for an electric vehicle described in Patent Literature 3 is introduced as a system in which the heat storage device is mounted in the electric vehicle and the heat is supplied therefrom for heating, thereby reducing the power consumption for warm air production. However, the heat storage amount of the heat storage device is limited, and hence there is a problem in that, although warm air can be produced at an initial stage of driving, continuous warm air production cannot be performed for a long period of time.

Further, in the case where the desiccant air conditioning technology that utilizes the dehumidifying member is used as a measure for preventing dew condensation (fogging) on an automobile window or the like, it is required to recognize that the moisture absorbing characteristics of the dehumidifying member are basically determined based on the condition of the regeneration air when the dehumidifying member is regenerated and the condition of the air to be processed when the dehumidifying member absorbs moisture from the air to be processed. That is, it is important to regenerate the dehumidifying member by regeneration air whose relative humidity is decreased as much as possible, and to increase the relative humidity of the air to be processed when the dehumidifying member is used to absorb moisture from the air to be processed.

In a widely-used desiccant HVAC device, from this point of view, the following pre-cool processing is executed. The compression refrigerating machine produces cold energy. The air to be processed is cooled with use of this cold energy, and then the cool air is caused to pass through the dehumidifying member. However, in the electric vehicle or the like, power for the pre-cool processing needs to be supplied from the in-vehicle battery, resulting in decrease in cruising distance. Therefore, the pre-cool processing in the widely-used desiccant HVAC device is ineffective as a measure against reduction in cruising distance of the electric vehicle or the like.

In the anti-fogging and air conditioning system for an electric vehicle described in Patent Literature 4, under the driving condition that the relative humidity of air passing through the dehumidifying member is low, a moisture absorption rate (rate of weight of the maximum absorption moisture per unit weight of a moisture absorbing agent in a dried state) of a moisture absorbing agent carried by the dehumidifying member is reduced, which causes a situation where a sufficient amount of moisture cannot be absorbed by the dehumidifying member. As a result, the amount of use of the dehumidifying member increases in long-term driving.

The compression-type HVAC device (hereinafter referred to as "HVAC device") mounted on the electric vehicle or the like has a basic configuration in which a compressor, an evaporator, a condenser, and an expansion valve for a refrigerant are connected to each other by a refrigerant circuit. Of those, the evaporator and the condenser are heat exchangers for the refrigerant and air. The evaporator absorbs, from air, evaporative latent heat generated along with the evaporation of the refrigerant, and hence the air temperature decreases. The refrigerant evaporated by the evaporator is compressed by the compressor to increase its pressure and temperature. This high-temperature refrigerant is introduced into the condenser to be liquefied by giving condensation heat to the air. At this time, the temperature of the air rises to generate a heating effect. After that, the refrigerant expands adiabatically at the expansion valve to decrease its pressure and temperature. This refrigerant is evaporated by the evaporator, and then compressed by the compressor again. In this manner, an air conditioning cycle is performed.

Further, in the desiccant air conditioning technology using the dehumidifying member, when the dehumidifying member absorbs moisture to become a saturation state, dehumidification is no longer possible unless the dehumidifying member is regenerated. Therefore, there is a drawback in that long-term continuous dehumidification is difficult.

Still further, the dehumidifying member itself also has a problem to be solved. As illustrated in FIG. 16, there has been conventionally known a flat-plate type dehumidifying member 300 obtained by setting up, as a corrugated board, a linerboard portion 302 formed of a planar carrier and a medium portion 303 formed of a corrugated carrier, both of which carry a dehumidifying agent. In recent years, in order to compactify the vehicle, the dehumidifying member may be demanded to be flexible so that the dehumidifying member may be arranged while being deformed in conformity to the shape of a part at which the dehumidifying member is to be arranged. However, the dehumidifying member having such a corrugated-board configuration is difficult to deform. Further, even when the carrier is made of a flexible material so as to enable deformation of the dehumidifying member, a part that is thinned due to the deformation may be crushed to cause trouble in air flow. Therefore, there is a drawback in that dehumidification is substantially impossible in the crushed part and in a part in which the air flow is inhibited by the crushed part.

SUMMARY

The present invention has been made to solve such conventional technological problems, and has an object to provide a dehumidifying device for a vehicle, which is capable of efficiently performing air conditioning of a vehicle. In particular, the present invention has an object to improve the efficiency of a dehumidifying device for a vehicle that includes a battery as a power source, and to reduce the power consumption. For example, the present invention has an object to suppress the use of electric power from a battery for glass window anti-fogging of an automobile and air conditioning of a vehicle including an automobile or the like, such as vehicle interior cooling and heating.

Further, the present invention has another object to provide an HVAC device for a vehicle, which is capable of performing efficient heating and dehumidifying operation as follows. The relative humidity of passing air when water vapor (insensible perspiration) exuded from an occupant riding on a vehicle such as an electric vehicle is dehumidified by a dehumidifying member is maintained high so as to increase the moisture absorption rate of the dehumidifying member. Thus, a large amount of water vapor can be absorbed with a small amount of dehumidifying member. In addition, heat removed from the passing air by an evaporator is returned to the passing air again at a condenser.

Further, the present invention has another object to provide a dehumidification technology of performing dehumidification by a desiccant air conditioning technology using a dehumidifying member, to thereby enable long-term continuous dehumidification and increase in efficiency of the dehumidification.

The present invention has still another object to provide a dehumidifying member capable of deforming in conformity to the shape of a part at which the dehumidifying member is to be arranged, even to a complicated shape including, for example, a narrow portion, and capable of preventing reduction in dehumidification performance due to the deformation.

In order to solve the above-mentioned problems, according to a first embodiment of the present invention, there is provided an HVAC device for a vehicle that performs air conditioning and operates using stored electric power as a power source. The HVAC device includes a blower for taking in interior air of the vehicle for ventilation and a heat exchanging unit for exchanging heat between the ventilation air and exterior air of the vehicle. There is also a moisture absorbing unit for absorbing moisture in the ventilation air, and a supply unit for supplying the ventilation air to a vehicle interior, in which the blower, the heat exchanging unit, the moisture absorbing unit, and the supply unit are connected to each other through ventilation pipes.

Further, according to a second embodiment of the present invention, there is provided an HVAC device for a vehicle that performs air conditioning and operates using stored electric power as a power source. The HVAC device includes a compression refrigerant cycle. The HVAC device may be configured to form, in a heating and dehumidifying operation mode of the HVAC device, a flow path configuration through actuation of a compressor constituting the compression refrigerant cycle and actuation of a first blower. Interior air of the vehicle may be introduced via a vehicle interior air intake duct, then, through switching of a first flow path switching unit, the interior air of the vehicle is supplied to an evaporator and a dehumidifying member. Then, through switching of a second flow path switching unit and a third flow path switching unit, the interior air of the vehicle is caused to pass through a condenser. The interior air of the vehicle is then caused to pass through electric heating unit, and, through switching of a fourth flow path switching unit, the interior air of the vehicle is caused to flow back to a vehicle interior via a vehicle interior air reflux duct.

The HVAC device may be configured to form, in a regenerating operation mode of the HVAC device, a flow path configuration in which, through actuation of the compressor constituting the compression refrigerant cycle and actuation of a second blower, outside air is taken in from an outside air introduction duct. Through switching of the fourth flow path switching unit, then the outside air is supplied to the electric heating unit and the condenser. Through switching of the third flow path switching unit and the second flow path switching unit, the introduced outside air is then caused to pass through the dehumidifying member and the evaporator in the stated order. Then, through control of the first flow path switching unit, the outside air is exhausted outside the vehicle from a first exhaust duct.

The HVAC device may also be configured to form, in a cooling and dehumidifying operation mode of the HVAC device, a flow path configuration in which, through actuation of the compressor constituting the compression refrigerant cycle and actuation of the first blower, the interior air of the vehicle is introduced via the vehicle interior air intake duct. Through switching of the first flow path switching unit, the interior air of the vehicle is then supplied to the evaporator and the dehumidifying member. Through switching of the second flow path switching unit and the fourth flow path switching unit, the introduced interior air of the vehicle is caused to flow back to the vehicle interior via the vehicle interior air reflux duct.

Also, the HVAC device may be configured to form a flow path configuration in which, through actuation of the second blower, the outside air taken in from the outside air introduction duct is supplied to the condenser. Then the passing outside air is introduced from the third flow path switching unit to a second exhaust duct to be exhausted outside the vehicle.

Further, according to a third embodiment of the present invention, there is provided a dehumidifying device for a vehicle, which performs air conditioning of a vehicle interior. The dehumidifying device includes a first dehumidifying unit and a second dehumidifying unit for dehumidifying air from the vehicle interior and then returning the dehumidified air to the vehicle interior.

There may also be a blower for blowing the air from the vehicle interior or outside air to at least one of the first dehumidifying unit or the second dehumidifying unit. The dehumidifying device may include a control unit for controlling operations of the first dehumidifying unit, the second dehumidifying unit, and the blower. The first dehumidifying unit may include a first dehumidifying member and a first heating portion configured to heat air flowing through the first dehumidifying unit with use of a battery mounted on the vehicle as a power supply thereof.

The second dehumidifying unit includes a second dehumidifying member and a second heating portion configured to heat air flowing through the second dehumidifying unit with use of the battery mounted on the vehicle as a power supply thereof.

The control unit is configured to alternately execute, in predetermined periods a first operation mode and a second operation mode. In the first operation mode of blowing, the control unit controls the blower to move the air from the vehicle interior into the first dehumidifying unit so as to cause the air from the vehicle interior to flow through the first dehumidifying member, to thereby dehumidify the air from the vehicle interior. The control unit also controls the blower to move the outside air into the second dehumidifying unit while the second heating portion is in a heating state so as to heat the outside air and cause the heated outside air to flow through the second dehumidifying member, to thereby regenerate the second dehumidifying member.

In the second operation mode, the control unit controls the blower to move the air from the vehicle interior into the second dehumidifying unit so as to cause the air from the vehicle interior to flow through the second dehumidifying member to thereby dehumidify the air from the vehicle interior. The control unit introduces by controlling the blower, the outside air into the first dehumidifying unit while the first heating portion is in a heating state so as to heat the outside air and cause the heated outside air to flow through the first dehumidifying member, to thereby regenerate the first dehumidifying member.

Further, according to a fourth embodiment of the present invention, there is provided a flexible dehumidifying member, including a granular carrier carrying a dehumidifying agent on a surface thereof. Also, the dehumidifying member includes a tubular body incorporating a plurality of the granular carriers and a flexible holder for holding a plurality of the tubular bodies therein in a movable manner, in which the tubular body and the flexible holder both have air permeability that enables dehumidification by the dehumidifying agent carried by the granular carrier.

In the HVAC device for an automobile according to one embodiment of the present invention, the dehumidifying member effectively absorbs water vapor exuded from an occupant during running of the automobile, and hence it is possible to produce low-relative-humidity and relatively high-temperature air with a fan alone.

Further, in the HVAC device for an automobile according to one embodiment of the present invention, by increasing the relative humidity of air to be subjected to dehumidification and then introducing the air to the dehumidifying member, the dehumidification efficiency can be increased.

Further, in the dehumidifying device for a vehicle according to one embodiment of the present invention, two dehumidifying units are prepared and switching between the dehumidifying operation and the regenerating operation for the dehumidifying member is controlled. In this manner, while the dehumidifying member is regenerated in one of the dehumidifying units, dehumidification can be performed with the dehumidifying member in the other dehumidifying unit. Therefore, continuous dehumidification can be performed without being restricted by the dehumidification capacity of the dehumidifying member.

Still further, the flexible dehumidifying member according to one embodiment of the present invention may perform dehumidification and regeneration, and may be deformed in conformity to the shape of a space in which the dehumidifying member is to be arranged. Therefore, for example, the dehumidifying member may be arranged even in a narrow space or a space with irregularities where arrangement of the dehumidifying member has been difficult conventionally, such as at a door or a seat of the automobile.

BRIEF DESCRIPTION OF THE DRAWINGS

FIG. 14 are explanatory diagrams illustrating switching timings among the first to third operation modes.

DETAILED DESCRIPTION

In the following, a first embodiment of the present invention is described in detail with reference to the drawings.

Note that, the following embodiments represent the case of an electric vehicle, but the present invention is widely applicable to a general HVAC device in addition to an HVAC device for an electric vehicle. For example, the present invention is widely applicable to an HVAC device that uses a battery as a power source, in particular, to an HVAC device to be mounted on a vehicle.

Therefore, the present invention is also applicable to, for example, a hybrid vehicle and a fuel cell vehicle. Further, it is difficult for a maglev train to obtain sufficient power supply from outside because the maglev train travels in a floating manner, and there are cases where a battery is used as a power source of the HVAC device. Therefore, the present invention is also applicable to a maglev train or the like. Further, the present invention is applicable to ships such as a motorboat and aircrafts if a battery is used as a power source of the HVAC device.

First Example

Figure 1:
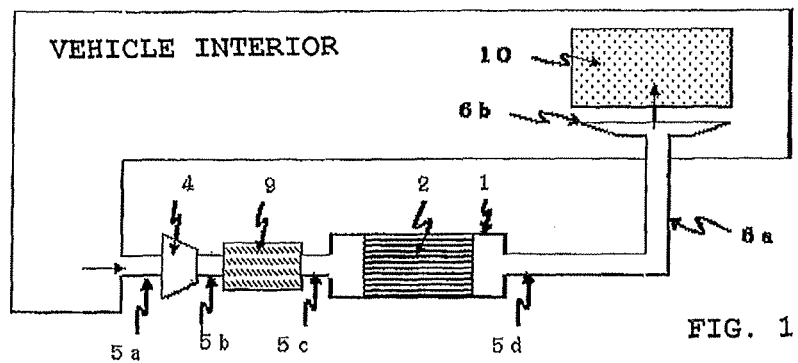
FIG. 1 is a schematic configuration diagram of an HVAC device for an automobile according to a first example of a first embodiment of the present invention.
Figure 4:
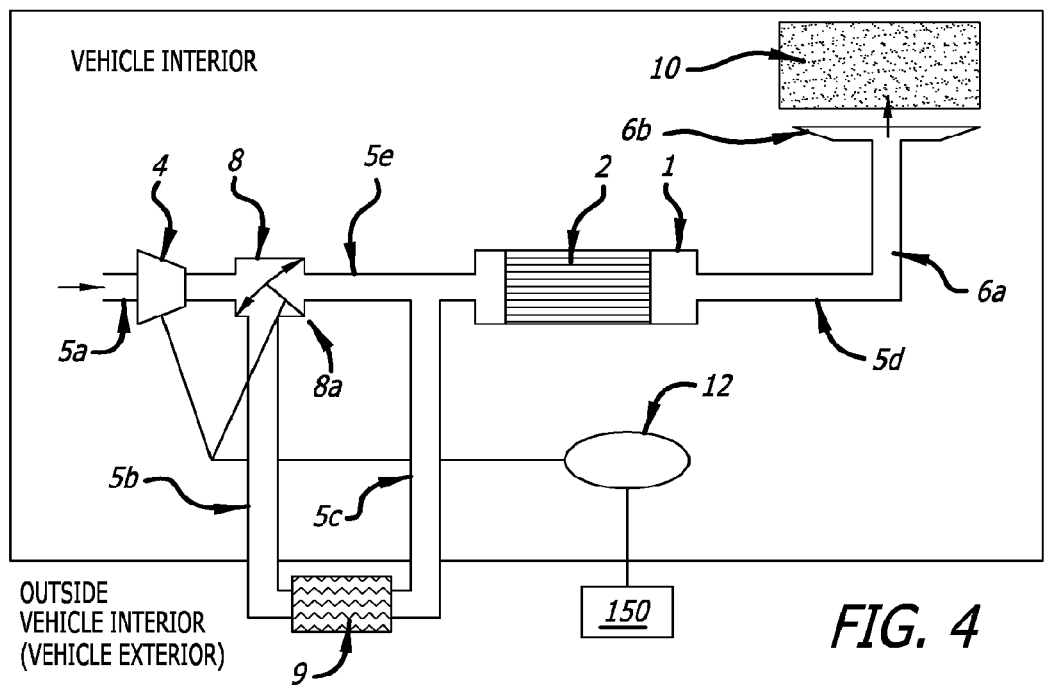
FIG. 4 is a schematic configuration diagram of a modification of the HVAC device for an automobile according to the first example of the first embodiment.

FIGS. 1 and 4 are schematic configuration diagrams of an HVAC device for an automobile according to a first example of the first embodiment of the present invention.

As illustrated in FIG. 1, vehicle interior air flows in by blower unit (fan) 4 from a flow path 5a, and passes through a flow path 5b and heat exchanging unit (heat exchanger) 9 for exchanging heat with outside air. After that, the vehicle interior air passes through a flow path 5c to be introduced into a dehumidifying unit 1. Inside the dehumidifying unit 1, a dehumidifying member 2 is provided. The vehicle interior air that has passed through the dehumidifying member 2 passes through a flow path 5d and a flow path 6a to be jetted toward a vehicle-side inner surface 10 such as a windshield from jetting unit (anti-fogging nozzle) 6b.

FIG. 4 is a modified example of the first example. On the downstream of the blower unit 4, flow path switching unit 8 is provided. A control device 12 receives temperature measurement results from detection unit 150 for detecting vehicle interior air temperature and detection unit for detecting outside air temperature. When the vehicle interior air temperature is higher than the outside air temperature, the control device 12 actuates the flow path switching unit 8 so that there is formed a flow path configuration in which the vehicle interior air passes through the heat exchanging unit 9 provided outside the vehicle interior, and then flows into the dehumidifying unit 1. When the vehicle interior air temperature is not higher than the outside air temperature, there is formed a configuration in which the vehicle interior air passes through bypass ventilation unit 5e, which is provided to cause the vehicle interior air to flow while bypassing the heat exchanging unit 9, to be introduced into the dehumidifying unit 1.

In the first example, the dehumidifying member 2 is removable from the dehumidifying unit 1, but alternatively, the dehumidifying unit 1 incorporating the dehumidifying member 2 may be separable from the flow path 5c and the flow path 5d.

Further, in FIGS. 1 and 4, the blower unit 4 is provided on the upstream side of the heat exchanging unit 9, but the blower unit 4 may be provided immediately in front of the dehumidifying member 2 so that the blower unit 4 and the dehumidifying member 2 are incorporated in the dehumidifying unit 1.

Figure 7:
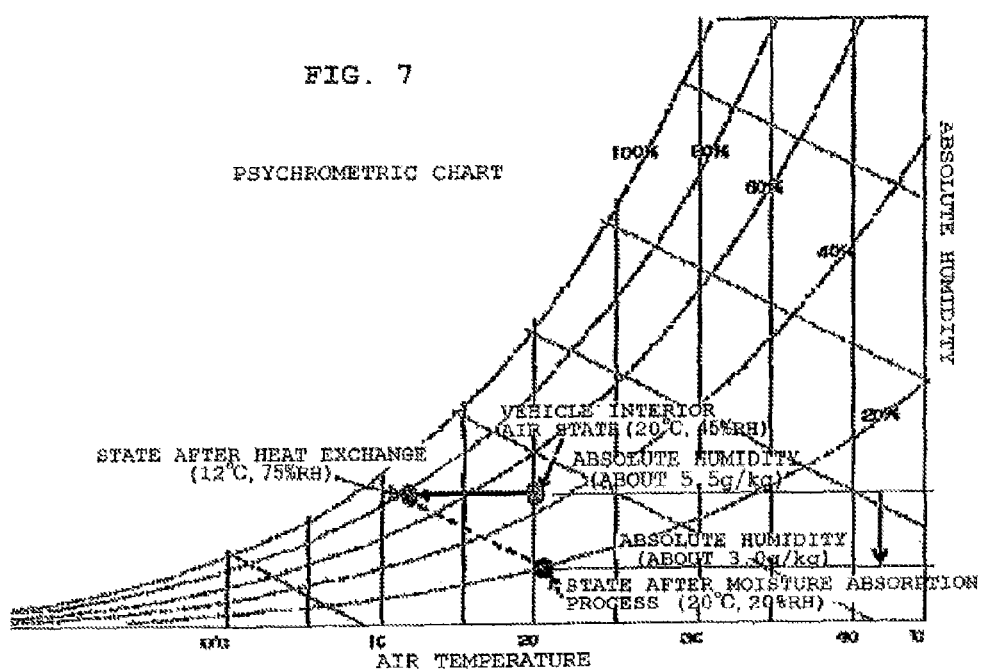
FIG. 7 is a characteristic change graph of vehicle interior air in a process in which the automobile HVAC device of the first embodiment absorbs moisture from the vehicle interior air.

FIG. 7 shows a case of a process in which, after the vehicle interior air is cooled by the heat exchanging unit 9 for exchanging heat with the outside air, the vehicle interior air passes through the dehumidifying member 2, and thus the absolute humidity decreases and the temperature increases.

Figure 6:
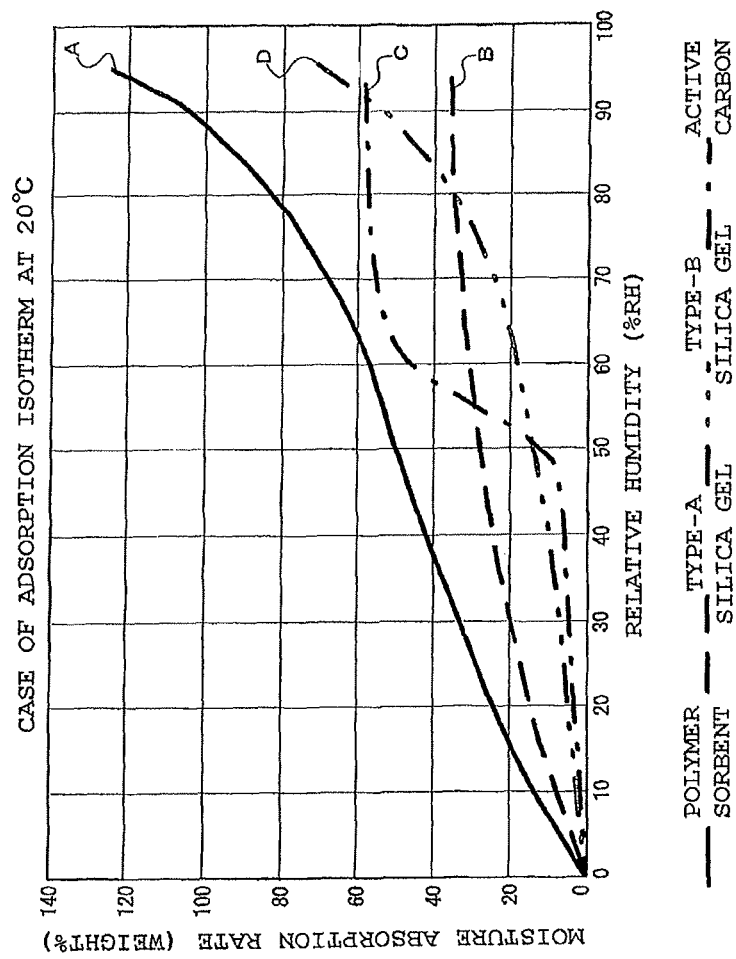
FIG. 6 is an example of an adsorption isotherm graph representing moisture adsorption characteristics of representative dehumidifying materials.

Next, moisture absorbing characteristics of the dehumidifying member are described. FIG. 6 is an example of an adsorption isotherm of representative dehumidifying materials. FIG. 6 shows the characteristics of the dehumidifying member by plotting relative humidity of air to be processed on the horizontal axis and plotting moisture absorption rate on the vertical axis. The moisture absorption rate refers to a value representing a rate of a moisture weight that can be absorbed by the dehumidifying agent with respect to the weight of the dehumidifying agent in a dried state. It is found that the moisture absorption rate increases along with the increase of the relative humidity plotted on the horizontal axis.

In FIG. 6, a solid line A, a dotted line B, a dashed-dotted line C, and a two-dot chain line D represent the moisture absorption rates of a polymer sorbent, type-A silica gel, type-B silica gel, and active carbon, respectively, with respect to humidity. As shown in FIG. 6, in all types of the dehumidifying agents, the moisture absorption rate increases as the relative humidity increases, although there is a difference of concave up and concave down in the graphs.

In particular, FIG. 6 shows that, when the polymer sorbent represented by the solid line A has a high relative humidity, the graph is concave up, and as the relative humidity increases, the moisture absorption rate increases at an accelerated rate.

In short, when the dehumidifying member is regenerated (dried) with air having a low relative humidity, and then this dehumidifying member is brought into contact with air having a high relative humidity, the dehumidifying member absorbs moisture from the air. Therefore, the moisture absorbing amount (weight) of the dehumidifying member is calculated by multiplying the difference between moisture absorption rates during regeneration and during moisture absorption by the weight of the dehumidifying agent in the dried state.

Next, an example of change in state of the air to be processed of the first example is described with reference to a psychrometric chart of FIG. 7.

The vehicle interior air (20° C., relative humidity of 45%, absolute humidity of about 6.5 g/kg) is supplied by the blower unit 4. After the vehicle interior air passes through the heat exchanging unit 9, the temperature thereof becomes about 12° C. and the relative humidity thereof becomes 75% (no change in absolute humidity). When passing through the dehumidifying member 2, the vehicle interior air is subjected to the action of moisture absorption with a substantially isenthalpic change. In the example of FIG. 7, after the vehicle interior air passes through the dehumidifying member, the temperature thereof becomes about 20° C., the relative humidity thereof becomes 20%, and the absolute humidity thereof becomes about 3.0 g/kg.

That is, when the vehicle interior air passes through the dehumidifying member 2, the absolute humidity thereof decreases by about 3.5 g/kg, and the air temperature increases by about 8° C.

It is found that air that has passed through the dehumidifying member to have a low relative humidity passes through the flow path 5d and 6a to be jetted toward the windshield 10 from the jetting unit (anti-fogging nozzle) 6b, to thereby contribute to prevention and removal of fogging generated on the vehicle-interior surface of the windshield 10, and also contribute to vehicle interior heating.

As the dehumidifying member 2 absorbs moisture from the passing air, its moisture absorbing characteristics are diminished. Therefore, it is necessary to replace the dehumidifying member 2 with a regenerated dehumidifying member 2 at a proper time.

The following state is considered. For example, the polymer sorbent represented in FIG. 6 is used as the dehumidifying member 2, and the dehumidifying member 2 is regenerated with air having a relative humidity of 10% at an external drying plant or the like. Then, the dehumidifying member 2 is provided to the HVAC device for an automobile. It is assumed that three humans are on the vehicle.

The amount of insensible perspiration from three occupants is about 90 g/h. Therefore, when the electric vehicle is used for about three hours, the dehumidifying member 2 is only required to process a moisture amount of about 270 g. It is assumed that the vehicle interior air is cooled by the heat exchanging unit 9 to have a relative humidity of 70%. Based on the adsorption isotherm graph of FIG. 6, the moisture absorption rate at the relative humidity of 70% is 68%, and the moisture absorption rate at the relative humidity of 10% is 13%. Therefore, the difference between the moisture absorption rates is 55 points. The amount of moisture to be processed is 270 g, and hence it is found that about 490 g (270/0.55) of polymer sorbent may be used as the dehumidifying member 2.

Further, the dehumidifying member 2 absorbs, from the passing air, moisture of 3.5 g in average per 1 kg of the passing air. Therefore, the present invention may be designed so that the passing air amount is 26 kg (=90/3.5) per hour. This passing air amount is about 22 $m^3$/h.

The volume of the dehumidifying member 2 including 490 g of polymer sorbent is about several liters. Therefore, when the dehumidifying member has a ventilation across-section of 10 cm×15 cm (area of 0.015 $m^2$), the depth of the dehumidifying member is 30 cm or less, and the average surface flow rate of the passing air is about 0.4 m/sec.

It is known that the performance to be exhibited by the dehumidifying member is less affected by the shape of the dehumidifying member. Therefore, the dimensions of the dehumidifying member may be selected based on the shape of the space in which the dehumidifying member is to be provided, and actually, the volume of the dehumidifying member may be selected with an extra amount.

Second Example

Figure 2:
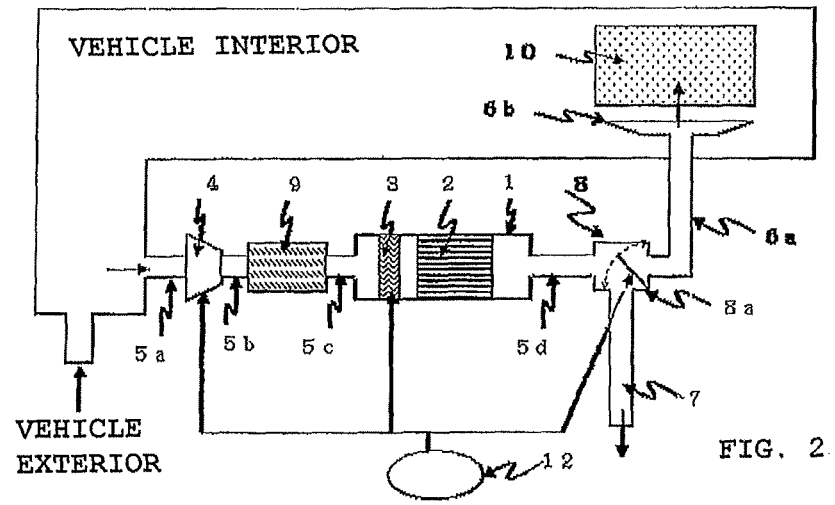
FIG. 2 is a schematic configuration diagram of an HVAC device for an automobile according to a second example of the first embodiment of the present invention.
Figure 3:
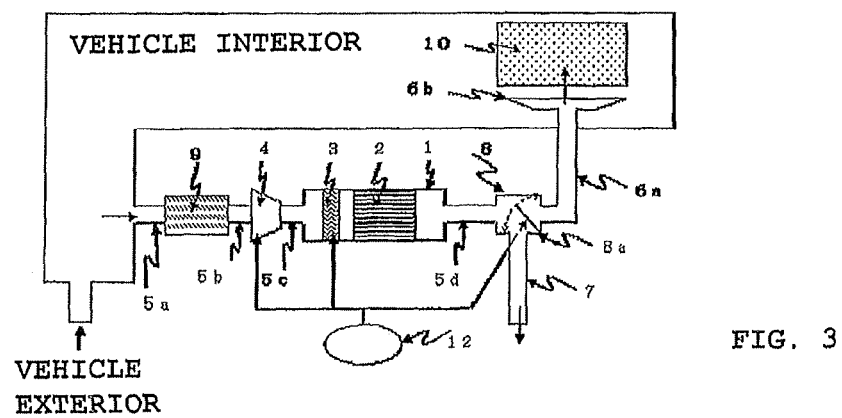
FIG. 3 is a schematic configuration diagram of a modification of the HVAC device for an automobile according to the second example of the first embodiment.
Figure 5:
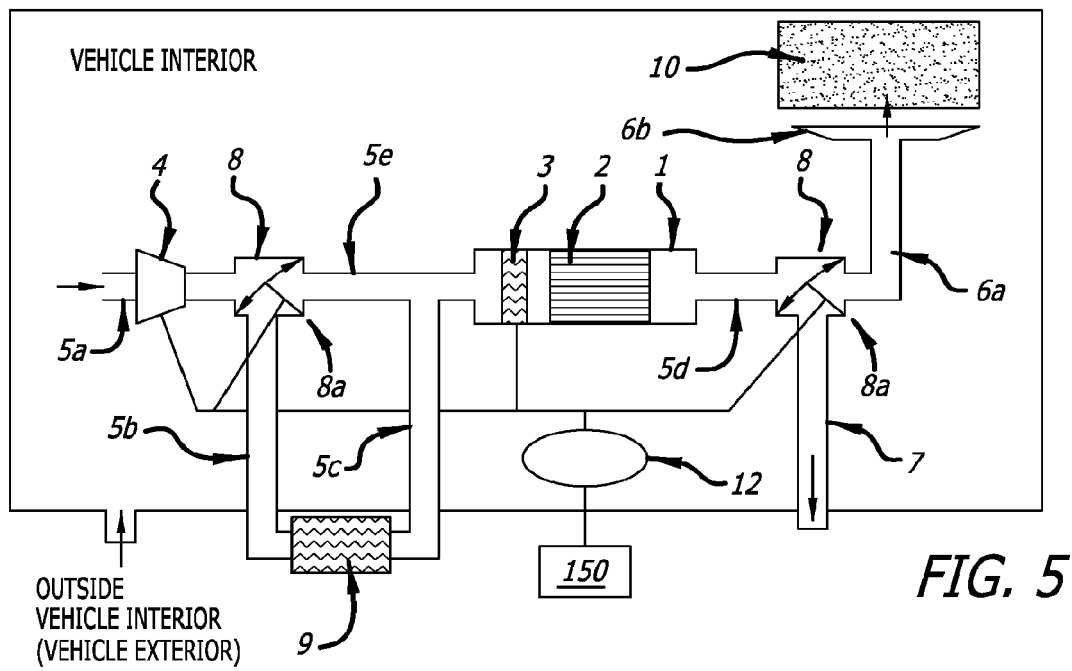
FIG. 5 is a schematic configuration diagram of a modification of the HVAC device for an automobile according to the second example of the first embodiment.

FIGS. 2, 3, and 5 are schematic configuration diagrams of an HVAC device for an automobile according to a second example of the first embodiment of the present invention.

In the second example illustrated in FIG. 2, heating unit 3 is provided inside the dehumidifying unit 1 and on the upstream side of the dehumidifying member 2, and the flow path switching unit 8 is provided on the downstream of the dehumidifying unit 1. In this manner, the vehicle interior air that has passed through the dehumidifying unit 1 is introduced into any one of a flow path 7 for exhausting air outside the vehicle and the jetting unit (anti-fogging nozzle) 6b via the flow path 6a.

Inside the flow path switching unit 8, a switching valve 8a is provided, which is actuated based on the command from the control device 12.

The example of FIG. 2 adopts, as the heating unit 3, an electric heater operated by power supply from outside the vehicle, but the heating unit 3 may be a heat exchanger operated by warm water supply from outside the vehicle. In short, it is only required to form a flow path configuration in which the heating unit 3 and the blower unit 4 are actuated to produce the warm air, and the warm air is introduced into the dehumidifying member 2 to regenerate the dehumidifying member 2.

In the second example, the dehumidifying member 2 is incorporated in the dehumidifying unit 1, and the dehumidifying member 2 is regenerated with supply of electric power, warm water, or warm air from the outside under a condition that the electric vehicle or the like is stopped.

The control device 12 detects a state in which electric power supply, warm water supply, warm air supply, or the like from the outside is set for the electric vehicle or the like. Then, the control device 12 issues, for example, a command for actuation or stoppage of the blower unit 4, a command for actuation or stoppage of the heating unit 3, or a command for selection of the air flow path to the flow path switching unit 8, and confirms that the HVAC device for an automobile is operated correctly. In addition, when the control device 12 detects temperature abnormality, the control device 12 performs safety control such as interrupting energy supply to the heating unit 3. It is needless to say that, even during running, the regenerating operation of the dehumidifying member 2 is possible by power supply from the battery, and the regenerating operation can be executed based on the driver's determination.

FIG. 5 illustrates a modified example of the second example of the first embodiment. As illustrated in FIG. 5, on the downstream of the blower unit 4, the flow path switching unit 8 and the bypass ventilation unit 5e for bypassing the heat exchanging unit 9 provided outside the vehicle are provided. The control device 12 receives temperature measurement results from measurement unit 150 for measuring the vehicle interior air temperature and measurement unit for measuring the outside air temperature. When the vehicle interior air temperature is higher than the outside air temperature, the control device 12 actuates the flow path switching unit 8 to form a flow path configuration in which the vehicle interior air passes through the heat exchanging unit 9. When the vehicle interior air temperature is not higher than the outside air temperature, the control device 12 performs control of selecting a flow path configuration in which the vehicle interior air is introduced into the bypass ventilation unit 5e and then introduced into the dehumidifying unit 1.

Further, as illustrated in FIG. 3, the blower unit 4 may be provided immediately in front of the heating unit 3. With such a configuration, the blower unit 4 can be integrated with the dehumidifying unit 1. Thus, the degree of freedom in arrangement of the entire HVAC device for an automobile is improved, and the entire device can be provided in a compact manner. The configuration intended to integrate the blower unit 4 with the dehumidifying unit 1 can be adopted also in the case where the heat exchanging unit 9 is provided outside the vehicle as illustrated in FIG. 5.

As described above, according to the first embodiment of the present invention, in an electric vehicle, a hybrid vehicle, a plug-in hybrid vehicle, or the like, which runs with use of stored electric power as a power source of an electric motor, one set or a plurality of sets of the dehumidifying units each incorporating the dehumidifying member having a moisture absorbing action are arranged inside the vehicle. During running of the vehicle or the like, when water vapor (insensible perspiration) exuded from an occupant or the like is absorbed by the dehumidifying member inside the dehumidifying unit, heat can be exchanged between the air to be processed and the outside air.

Further, the dehumidifying member has characteristics of generating moisture absorbing heat when the dehumidifying member absorbs moisture (water vapor) from the air to be processed. For example, when the dehumidifying member absorbs moisture of 1 g from air to be processed of 1 kg, the temperature of the air to be processed rises by about 2.5° C. In the first embodiment, this moisture absorbing heat is utilized as a temperature recovering mechanism of the air to be processed in low temperature due to heat exchange with the outside air. Thus, the absolute humidity can be effectively reduced, and the temperature of the air to be processed can be recovered.

That is, when the outside air temperature is lower than the vehicle interior temperature, the temperature of vehicle interior air to be processed is lowered by exchanging heat with the outside air, and the relative humidity of the air to be processed is increased. After that, the air to be processed is introduced into the dehumidifying member. With this, it is possible to secure a high moisture absorption rate (rate of weight of the absorbing moisture with respect to the dehumidifying member in a dried state) which is exhibited by the dehumidifying member in a high relative humidity region. Therefore, the moisture absorbing amount of the dehumidifying member increases, and a larger amount of moisture can be absorbed.

Further, in a stage in which the moisture absorbing performance of the dehumidifying member is reduced, because the dehumidifying member or the dehumidifying unit incorporating the dehumidifying member is removable from the HVAC device for an automobile, regeneration air having a low relative humidity can be used when the dehumidifying member that has absorbed moisture is regenerated outside the vehicle. As a result, the dehumidifying member can absorb a larger amount of moisture.

Moreover, the dehumidifying member or the dehumidifying unit incorporating the dehumidifying member is removable from the HVAC device for an automobile, and hence the regenerated dehumidifying member or dehumidifying unit can be set to the HVAC device for an automobile at an arbitrary timing. Therefore, by preparing a plurality of regenerated dehumidifying members or dehumidifying units, continuous anti-fogging of the windshield and continuous vehicle interior heating are possible.

Further, in regeneration of the dehumidifying member or the dehumidifying unit, unused heat from a waste incineration plant or the like may be used to produce low-relative-humidity and high temperature air. This air may be used for regeneration of the dehumidifying member, and thus energy having low environmental load can be used. By utilizing this regeneration unit, measures against global warming can be further promoted.

As described above, with use of the HVAC device for an automobile according to the present invention, the dehumidifying member effectively absorbs insensible perspiration (water vapor) exuded from an occupant when the automobile is running. Therefore, low-relative-humidity and relatively high-temperature air can be produced with power of the blower unit (fan) alone.

Further, in summer, the absolute humidity of the vehicle interior air can be decreased due to the moisture absorbing action of the dehumidifying member. Therefore, the amount of dew condensation (moisture condensation) inside a compression refrigerating machine can be reduced, and the operation efficiency of the compression refrigerating machine can be improved. With this, the power consumption of the compression refrigerating machine can be reduced and the size and weight of the device can be reduced.

In general, the dehumidifying member has characteristics of absorbing a larger amount of water vapor as the relative humidity of peripheral air is higher. The moisture absorption rate increases along with the increase of the relative humidity in a range of the relative humidity of 0% to the relative humidity of 100%. Therefore, increasing the relative humidity of the air to be processed when the dehumidifying member absorbs moisture from the air to be processed is a measure effective for increasing the moisture absorbing amount of the same dehumidifying member.

In short, in order to increase the moisture absorbing performance of the regenerated dehumidifying member, it is effective to increase the relative humidity of the air to be processed that passes through the dehumidifying member. Therefore, in the present invention, at the time of a condition that the outside air temperature is lower than the temperature of the vehicle interior air, the heat exchanging unit is used to decrease the temperature of the air to be processed by the outside air, and the relative humidity of the air to be processed is increased. Then, the air to be processed is introduced into the dehumidifying member.

By decreasing the temperature of the air to be processed by the heat exchanging unit for exchanging heat with the outside air, the dehumidifying member can absorb a large amount of water vapor (insensible perspiration) exuded from an occupant. Therefore, it is possible to provide an HVAC device for an automobile that is capable of, even with the same weight of dehumidifying member, preventing, for a long period of time, condensation of water vapor (dew condensation) occurring on the windshield or the like.

As described above, according to the first embodiment, in the HVAC device for an automobile to be mounted onto an electric vehicle or the like, the vehicle interior air is cooled by the outside air and then introduced into the dehumidifying member. Therefore, the relative humidity of the vehicle interior air flowing into the dehumidifying member increases, and thus an effect of increasing the moisture absorption rate of the dehumidifying member can be obtained. In this manner, even with the same dehumidifying member, a larger amount of moisture can be absorbed. That is, when the electric vehicle or the like is driven, a large amount of insensible perspiration exuded from an occupant (about 30 g/h per person) and moisture (water vapor) taken inside the vehicle by the outside air can be absorbed and processed. Therefore, it is possible to prevent, for a long period of time, the absolute humidity of the vehicle interior air from increasing, and to perform anti-fogging of the windshield or the like of the electric vehicle or the like and vehicle interior heating.

As described above, during running of the electric vehicle, the temperature of the air to be processed is decreased by the outside air. Therefore, the moisture absorbing performance of the dehumidifying member exhibited when dew condensation of the windshield or the like is prevented by the moisture absorbing action of the dehumidifying member is improved. With those effects, it is possible to provide an HVAC device for an electric vehicle that is capable of reducing the amount of electric power to be used for anti-fogging and cooling as compared to a conventional-type electric vehicle, and contributes to increase in cruising distance of the electric vehicle and to reduction in capacity of the in-vehicle battery.

Next, a second embodiment of the present invention is described in detail with reference to the drawings.

Figure 8:
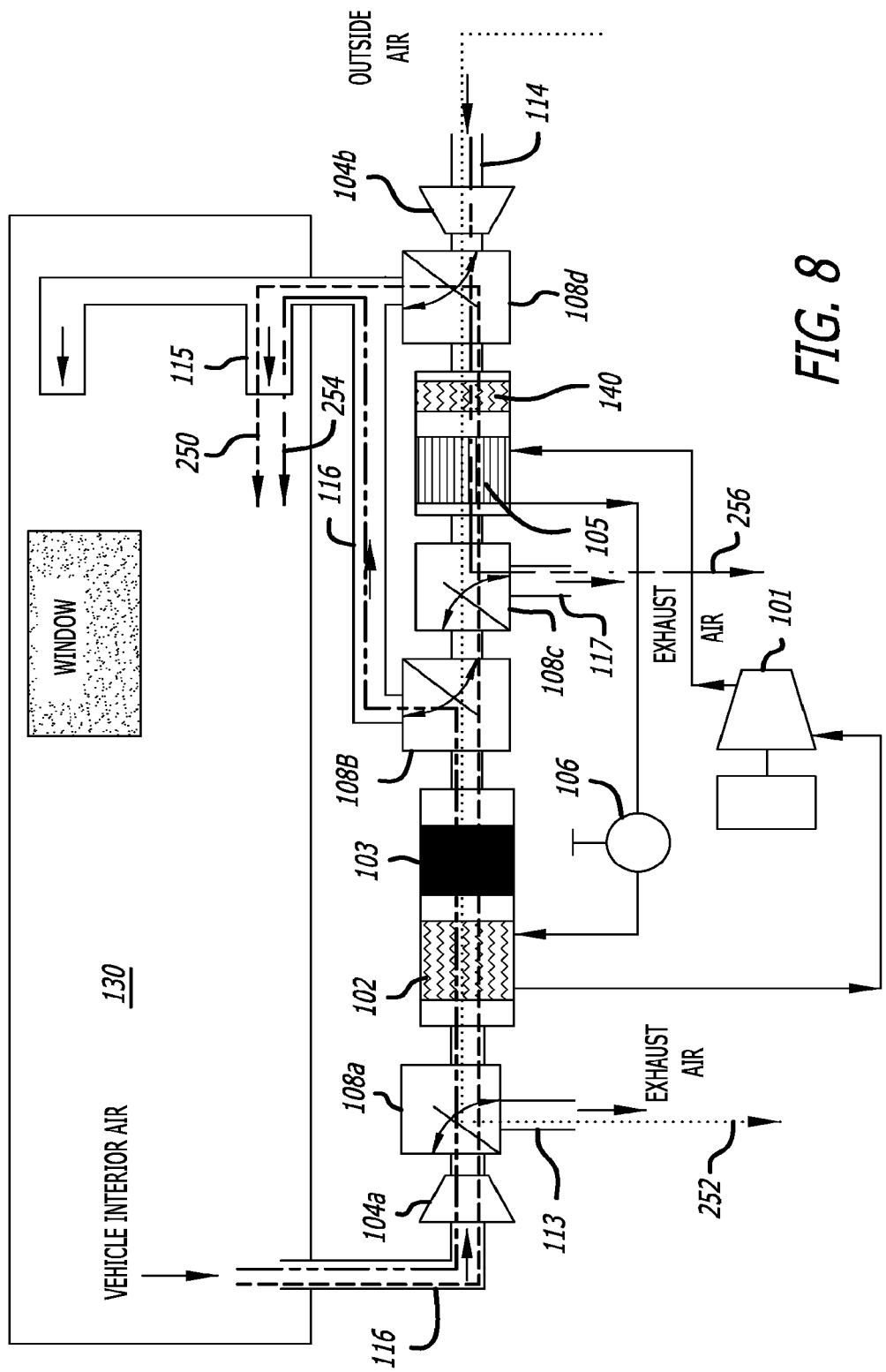
FIG. 8 is a configuration diagram of an HVAC device provided in an electric vehicle or the like according to a second embodiment of the present invention.

FIG. 8 is a configuration diagram of an HVAC device installed on an electric vehicle or the like according to the second embodiment. The HVAC device includes a compressor 101, an evaporator 102, a dehumidifying member 103, blower unit 104*a* and 104*b*, a condenser 105, an expansion valve 106, flow path switching unit (108a, 108b, 108c, and 108d), electric heating unit 140, temperature measurement unit, and various ventilation ducts (113, 114, 115, 116, and 117).

As illustrated in FIG. 8, in the in-vehicle HVAC device for the electric vehicle or the like of the second embodiment, a heating and dehumidifying operation is executed during running in cold weather. In the heating and dehumidifying operation, a process of absorbing moisture by the dehumidifying member 103 is executed so that water vapor exuded from an occupant is absorbed by the dehumidifying member 103, to thereby suppress increase in humidity inside the vehicle. Specifically, the following first air flow path 250 is formed. While actuating the compressor 101, the first blower unit 104a is actuated so that vehicle interior air 130 is taken in from the vehicle interior air intake duct 116. After that, the flow path is selected by the first flow path switching unit 108a so that the vehicle interior air 130 passes through the evaporator 102 and the dehumidifying member 103. After that, the flow path is selected by the second and third flow path switching unit 108b and 108c so that the vehicle interior air 130 is introduced into the condenser 105. The temperature of the air that has passed through the condenser 105 is measured by the measurement unit (not shown in FIG. 8) for measuring temperature of passing air. When the measured temperature is a predetermined value or less, the electric heating unit 140 is actuated to increase the temperature to a predetermined temperature. After that, the air passes through a fourth flow path switching unit 108d and flows back to the vehicle interior via the vehicle interior air reflux duct 115.

Further, in the in-vehicle HVAC device for the electric vehicle or the like of the second embodiment, for example, during time period of battery charging or the like, a stoppage-period regenerating operation of regenerating the dehumidifying member 103 is performed. In this stoppage-period regenerating operation, as illustrated in FIG. 8, the first blower unit 104a is stopped, and the compressor 101 and the second blower unit 104b of the in-vehicle HVAC device are actuated. In this manner, a second air flow path 252 is created where the outside air is taken in from the outside air introduction duct 114. Then, after the flow path is selected by the fourth flow path switching unit 108d, the outside air is introduced by the second blower unit 104b into the condenser 105 via the electric heating unit 140. After that, the flow path is selected by the third flow path switching unit 108c and the second flow path switching unit 108b so that the outside air passes through the dehumidifying member 103 and the evaporator 102, and is then exhausted outside the vehicle from the first flow path switching unit 108a via the first exhaust duct 113. At this time, the temperature of the air that has passed through the condenser 105 is measured by the measurement unit for measuring temperature of passing air. When the measured temperature is a predetermined value or less, the electric heating unit 140 is actuated to increase the temperature to a predetermined temperature. After that, the air is supplied to the dehumidifying member 103. By the way, the air flow path configuration in this regeneration process is similar to that in a running-period regenerating operation that is carried out during running of the electric vehicle or the like. In a situation where the moisture absorbing performance of the dehumidifying member 103 is reduced as a result of continuous running, the moisture absorbing process is temporarily stopped to carry out the regeneration process. Thus, the moisture absorbing performance of the dehumidifying member is recovered.

Further, in the second embodiment, when the in-vehicle HVAC device is operated in a cooling and dehumidifying operation, as illustrated in FIG. 8, the compressor 101 is actuated, and for this third air flow path 254, the first blower unit 104a is used to take in the vehicle interior air 130 from the vehicle interior air intake duct 116. The vehicle interior air 130 passes via the first flow path switching unit 108a through the evaporator 102 and the dehumidifying member 103. Then, from the second flow path switching unit 108b, the vehicle interior air 130 flows into the vehicle interior air reflux duct 115 so as to flow back to the vehicle interior. At this time, when the air whose temperature is decreased (depending on the condition, the humidity is decreased) by the evaporator 102 passes through the dehumidifying member 103, the humidity thereof is further decreased and the temperature thereof is slightly increased due to the moisture absorbing action. As a result, the relative humidity of the reflux air decreases, and thus it is possible to obtain an effect of securing occupant comfort. Further, during the cooling and dehumidifying operation, the second blower unit 104b is also actuated. For this fourth air flow path 254, the outside air taken in from the outside air introduction duct 114 is supplied by the second blower unit 104b, and is then subjected to flow path control by the fourth flow path switching unit 108d to be directed toward the condenser 105. After that, the outside air is cooled by the condenser 105. Then, the flow path is selected by the third flow path switching unit 108c, and thus the outside air is exhausted outside the vehicle via the second exhaust duct 117.

Figure 9:
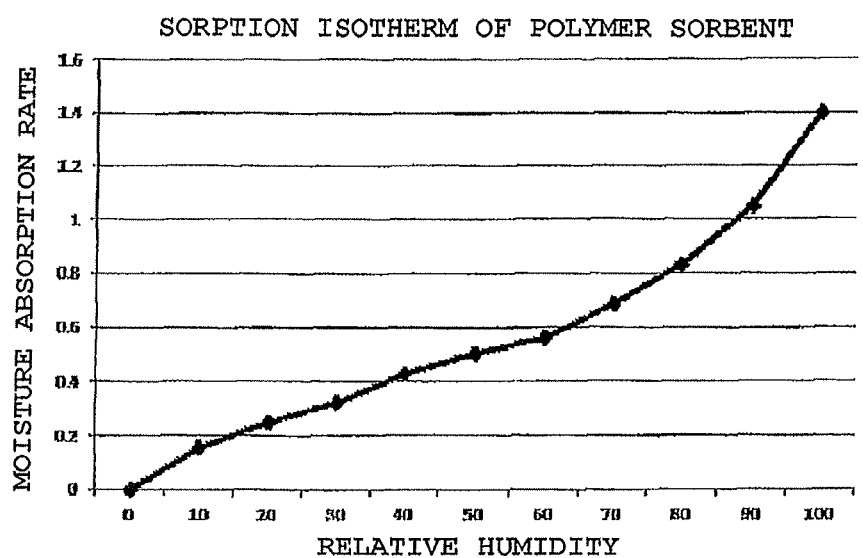
FIG. 9 is a sorption isotherm graph of a polymer sorbent represented as an example of a dehumidifying agent used in the second embodiment.

Configuration and Action of in-Vehicle HVAC Device for Electric Vehicle or the Like FIG. 9 is a sorption isotherm graph of a polymer sorbent (which is defined similarly to a general adsorption isotherm) in a case of using a dehumidifying member carrying a polymer sorbent sold by Japan Exlan Co., Ltd. FIG. 9 has a horizontal axis representing air relative humidity, and a vertical axis representing a moisture absorption rate (=ratio of weight of sorption moisture per unit weight of polymer sorbent). As is understood from FIG. 9, the moisture absorption rate increases along with the increase of the relative humidity. Other dehumidifying agents have similar trends as this characteristic, but the characteristic that the moisture absorption rate exceeds 1.0 in a region having a high relative humidity is unique to a polymer sorbent.

The in-vehicle HVAC device of the second embodiment uses a dehumidifying member carrying a polymer sorbent or another moisture absorbing substance. Therefore, by decreasing the air temperature in advance by the evaporator 102 to increase the relative humidity, and then introducing the air into the dehumidifying member 103, the moisture absorbing performance of the dehumidifying member 103 can be improved. Thus, a large amount of moisture can be absorbed with a small amount of dehumidifying member. Therefore, the dehumidifying member 103 can be compactified. In particular, in a case of the dehumidifying member 103 carrying the polymer sorbent, by increasing the relative humidity of air close to 100%, there is a significantly large effect in applying the characteristic that the moisture absorption rate rapidly increases.

Further, in the in-vehicle HVAC device of the second embodiment, as illustrated in FIG. 8, a refrigerant pathway is set as a circulation pathway in the order of the compressor 101, the condenser 105, the expansion valve 106, the evaporator 102, and the compressor 101. No refrigerant flow path switching valve or the like is provided in this pathway, and hence it is possible to prevent a leak accident of refrigerant from the refrigerant circulation path.

Further, in the second embodiment, as illustrated in FIG. 8, the two blower unit 104a and 104b that form air flow pathways in opposite directions are provided at both end portions of a ventilation pathway. The operation and stoppage of those blower unit, and operations of the four flow path switching unit 108a, 108b, 108c, and 108d, the electric heating unit 140, and the compression refrigerant cycle are controlled in accordance with operation modes such as a regenerating operation mode, a heating and dehumidifying operation mode, and a cooling and dehumidifying operation mode. In this manner, optimal flow path formation and actuation of the component devices are possible in accordance with each of the operation modes.

Under a state in which the outside air temperature is lower than the vehicle interior temperature, the temperature of the window is decreased. Therefore, water vapor exuded from an occupant condensates on the window and fogging occurs in a relatively short period of time. In order to avoid this phenomenon, in the conventional electric vehicle or the like, low-temperature outside air having a relatively low absolute humidity is taken inside the vehicle. However, in order to maintain the heating, electric power from the in-vehicle battery is used to heat the outside air. Therefore, the cruising distance of the electric vehicle or the like is reduced.

In contrast, in the second embodiment, the dehumidifying member 103 is provided to the in-vehicle HVAC device, and when the vehicle interior air 130 is dehumidified, the evaporator 102 is used to cool the vehicle interior air 130, and then the vehicle interior air 130 is introduced into the dehumidifying member 103. With this, the moisture absorption rate of the dehumidifying member 103 can be set high, and the dehumidifying member 103 can be downsized. Further, in cold weather, moisture absorbing heat generated by the dehumidifying member 103 is passed to the passing air. In addition, after the temperature of the passing air is increased by the compressor 101, heat extracted from the passing air by the evaporator 102 is returned to the passing air again by the condenser 105. Therefore, the vehicle interior air can obtain the moisture absorbing heat of the dehumidifying member 103 and heat corresponding to the power in the compressor 101 of the in-vehicle HVAC device in addition to the originally retained heat. In this manner, as compared to electric power used by the conventional electric vehicle or the like for heating outside air, energy can be significantly saved.

Further, the second embodiment employs a simple system of controlling the two blower unit 104a and 104b and the four flow path switching unit 108a, 108b, 108c, and 108d in accordance with the operation modes of the in-vehicle HVAC device (stoppage-period regenerating operation, running-period regenerating operation, heating and dehumidifying operation, cooling and dehumidifying operation, and the like). Therefore, there is an advantage in that the conventional component devices of the in-vehicle HVAC device can be utilized.

As described above, in the in-vehicle HVAC device of the electric vehicle or the like of the second embodiment, when water vapor (insensible perspiration) exuded from an occupant is absorbed by the dehumidifying member 103, the moisture absorption rate of the dehumidifying member 103 can be maintained high. In addition, the moisture absorbing heat of the dehumidifying member 103 can be used for heating. Therefore, water vapor exuded from an occupant can be absorbed for a long period of time in the heating and dehumidifying operation in cold weather. Thus, it is possible to secure an effect of reducing fogging that occurs on the windshield or the like of the electric vehicle or the like.

Similarly, in the cooling and dehumidifying operation in summer, after the vehicle interior air 130 is cooled by the evaporator 102, by using actions of dehumidification and heating of the dehumidifying member 103 (which occur because the moisture absorbing heat is generated and the air temperature slightly increases due to the isenthalpic change), comfort vehicle interior cooling can be achieved.

In the second embodiment, the dehumidifying member 103 is regenerated with use of outside air whose temperature is increased by passing through the electric heating unit 140 and the condenser 105. At this time, the heat energy supplied from the condenser 105 is heat collected from the passing air by the evaporator 102 and then further increased due to refrigerant compression by the compressor 101. Therefore, in principle, high-temperature energy to be used for regeneration is achieved from the energy of heating by the electric heating unit 140 and the energy of power of the compressor alone. Further, when a polymer sorbent is adopted as the dehumidifying agent to be carried by the dehumidifying member, if the regeneration temperature is 40° C. or more, rapid regeneration is possible, in which the dehumidifying amount of regeneration air per unit weight is 8 g/kg or more. As a result, moisture contained in the dehumidifying member 103 can be removed with a small amount of air, and thus regeneration is possible in a short period of time. Thus, operation is possible with extremely high energy-saving performance. Further, the refrigerant temperature rising range of the in-vehicle HVAC device may be relatively small, and hence the coefficient of performance (COP) of the compression air conditioning cycle can also maintain a good value.

According to the second embodiment of the present invention, the following in-vehicle HVAC device for the electric vehicle or the like is provided. When the electric vehicle or the like is used under a condition that the outside air temperature is low, by actuating the compressor 101 of the in-vehicle HVAC device and controlling the flow path switching unit, the in-vehicle HVAC device forms the following air flow path. The vehicle interior air 130 is supplied by the first blower unit 104a to the evaporator 102. After that, the vehicle interior air 130 is caused to pass through the dehumidifying member 103, and then through the condenser 105 and the electric heating unit 140. Thus, the vehicle interior air 130 is caused to flow back to the vehicle interior.

Further, according to the second embodiment, the following in-vehicle HVAC device for the electric vehicle or the like is also provided. When the electric vehicle or the like is used under a condition that the outside air temperature is high, by actuating the compressor 101 of the in-vehicle HVAC device and controlling the flow path switching unit, the in-vehicle HVAC device forms the following air flow path. The vehicle interior air 130 is supplied by the first blower unit 104a to the evaporator 102. After that, the vehicle interior air 130 is caused to pass through the dehumidifying member 103. Thus, the vehicle interior air 130 is caused to flow back to the vehicle interior.

Further, according to the second embodiment, the following in-vehicle HVAC device for the electric vehicle or the like is provided. By controlling the flow path switching unit, and by, for example, during charging of the in-vehicle battery of the electric vehicle or the like, actuating the compressor 101 of the in-vehicle HVAC device, and under a state in which the first blower unit 104a is stopped, actuating the second blower unit 104b, the in-vehicle HVAC device forms the following airflow path. The outside air is introduced into the electric heating unit 140 and the condenser 105, and then caused to pass through the dehumidifying member 103 and the evaporator 102. Then, the air is exhausted outside the vehicle via the first exhaust duct 113.

Further, according to the second embodiment, the following in-vehicle HVAC device for the electric vehicle or the like is provided. By controlling the flow path switching unit, and by, even when the electric vehicle or the like is driven, actuating the compressor 101 of the in-vehicle HVAC device, and under a state in which the first blower unit 104a is stopped, actuating the second blower unit 104b, the in-vehicle HVAC device forms the following air flow path. The outside air is introduced into the electric heating unit 140 and the condenser 105, and then caused to pass through the dehumidifying member 103 and the evaporator 102. Then, the air is exhausted outside the vehicle via the first exhaust duct 113.

Further, according to the second embodiment of the present invention, the following effect is also obtained. First, the phenomenon that the dehumidifying member 103 adsorbs and desorbs moisture with respect to the ambient air depends on the air relative humidity difference between during moisture adsorption and moisture desorption. Therefore, the dehumidifying member 103 is regenerated with air whose relative humidity is decreased as much as possible, and after that, the dehumidifying member 103 is placed in air whose relative humidity is increased as much as possible. In this manner, the moisture absorption rate to be exhibited by the dehumidifying member 103 can be increased. That is, the following operation is effective. The relative humidity of the air to be dehumidified is increased, and then the air is introduced into the dehumidifying member 103. When regenerating the dehumidifying member, regeneration air is heated to decrease the relative humidity thereof, and then the regeneration air is introduced into the dehumidifying member 103.

By configuring the in-vehicle HVAC device exhibiting such an effect, the moisture absorption rate of the dehumidifying member 103 incorporated in the in-vehicle HVAC device can be increased. Further, the dehumidifying member can be downsized, or a long-term moisture absorbing process can be achieved even with the same dehumidifying member.

Next, a regeneration process of the dehumidifying member 103 is described. The compressor 101 of the in-vehicle HVAC device is actuated, and a high-temperature refrigerant gas flowing out from the compressor 101 is introduced into the condenser 105. In this manner, heat exchange is performed between the refrigerant and the passing air. Air (generally, outside air) whose temperature is increased (simultaneously, the relative humidity is decreased) bypassing through the electric heating unit 140 and the condenser 105 is introduced into the dehumidifying member 103 as regeneration air, to thereby regenerate the dehumidifying member 103. At this time, the air flows in the order of the outside air introduction duct 114, the second blower unit 104b, the electric heating unit 140, the condenser 105, the dehumidifying member 103, the evaporator 102, the first exhaust duct 113, and outside the vehicle.

Next, a moisture absorbing process of the dehumidifying member 103 is described. After the regeneration of the dehumidifying member 103 is completed, the vehicle interior air 130 is circulated in the order of the air intake duct 116 for the vehicle interior air 130, the first blower unit 104a, the evaporator 102, the dehumidifying member 103, the condenser 105, the electric heating unit 140, the vehicle interior air reflux duct 115, and the vehicle interior. In this process, the vehicle interior air 130 thus taken in is cooled by the evaporator 102 so that the temperature thereof is decreased (simultaneously, the relative humidity thereof is increased), and then the cooled air flows into the dehumidifying member 103. Therefore, the dehumidifying member 103 absorbs moisture under a state in which a high moisture absorption rate is maintained. The air whose humidity is decreased is heated by the condenser 105 and the electric heating unit 140, and then caused to flow back to the vehicle interior. With this procedure, high-temperature and low-humidity air supply is performed. Therefore, even when the air is brought into contact with a low-temperature glass window, dew condensation is avoided, and good visibility is maintained.

Needless to say, when the electric vehicle or the like is started up in cold weather, initial heating of the vehicle interior is executed with use of the electric heating unit (for example, electric heater) 140 and the air temperature measurement unit for measuring temperature of air that has passed through the heating unit, which are provided to the in-vehicle HVAC device. Those electric heating unit 140 and temperature measurement unit are provided between the condenser 105 and the fourth flow path switching unit (108d).

In the second embodiment, during the moisture absorbing process and the regeneration process of the dehumidifying member 103, the two blower unit 104a and 104b and the four flow path switching unit 108a, 108b, 108c, and 108d are controlled so that the direction of the air flow is reversed, and further both processed are performed at different times. Thus, it is possible to operate the electric vehicle or the like capable of, for example, performing the moisture absorbing process when the vehicle is running, and performing the regeneration process when the vehicle is stopped for charging the in-vehicle battery or the like.

As described above, with use of the in-vehicle HVAC device for the electric vehicle or the like according to the second embodiment, when the electric vehicle or the like is running, the dehumidifying member 103 absorbs water vapor exuded from an occupant for a long period of time. Therefore, the absolute humidity of the vehicle interior air 130 is controlled to be a predetermined value or less, and thus occurrence of fogging on a window or the like can be prevented. Further, the dehumidified air is heated by the condenser 105. Therefore, there is executed a heat pump operation in which, after the temperature of the passing air is increased by the compressor 101, the energy collected from the passing air by the evaporator 102 is returned from the condenser. Thus, economic air heating is realized.

In the season when the outside air temperature is high and the in-vehicle HVAC device is mainly used for cooling, the following flow path configuration is formed. When the electric vehicle or the like is running, the vehicle interior air 130 is taken in from the vehicle interior air intake duct 116. The vehicle interior air 130 passes through the first blower unit 104a, the evaporator 102, and the dehumidifying member 103, and then passes from the second flow path switching unit 108b through the vehicle interior air reflux duct 115 so as to flow back to the vehicle interior. At this time, the second blower unit 104b is also actuated, and the outside air taken in from the outside air introduction duct 114 is caused to pass through the second blower unit 104b and the condenser 105. Then, the outside air is caused to pass through the third flow path switching unit 108c and the second exhaust duct 117 to be exhausted outside the vehicle.

Next, a third embodiment of the present invention is described in detail with reference to the drawings.

In this embodiment, a case where the present invention is applied to a dehumidifying device including two dehumidifying units provided to the electric vehicle, for dehumidifying air from the vehicle interior is described in detail with reference to the drawings.

Figure 10:
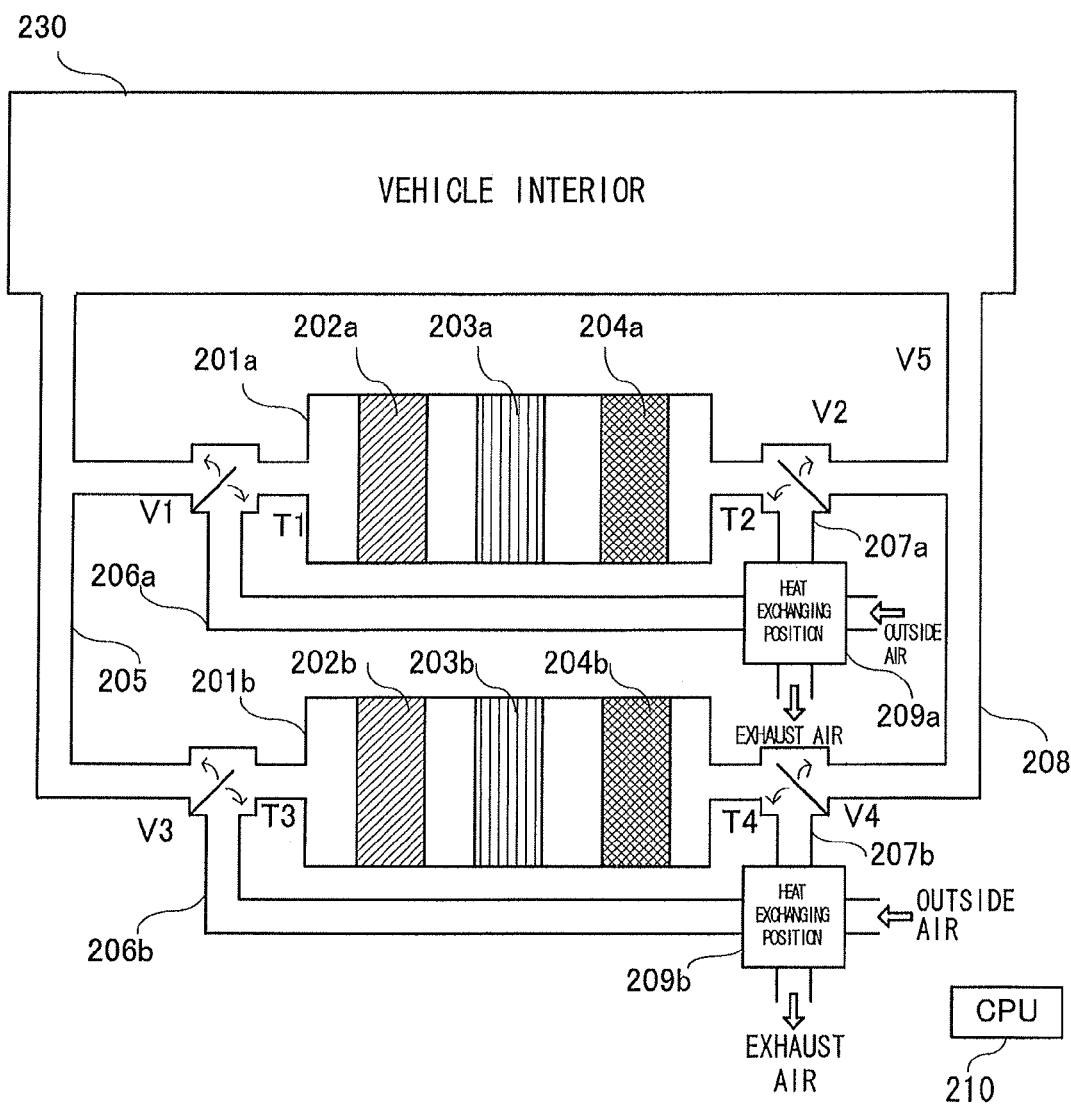
FIG. 10 is a schematic configuration diagram of a dehumidifying device for a vehicle according to a third embodiment of the present invention.

FIG. 10 is a schematic configuration diagram of a dehumidifying device for a vehicle according to the third embodiment of the present invention. In FIG. 10, a dehumidifying system includes a first dehumidifying unit 201a, a second dehumidifying unit 201b, a CPU 210 as control unit, switch valves V1 and V2 provided at an inflow portion and an outflow portion of the first dehumidifying unit 201a, respectively, and switch valves V3 and V4 provided at an inflow portion and an outflow portion of the second dehumidifying unit 201b, respectively.

The first dehumidifying unit 201a includes a first fan 202a, a first heater 203a, and a first dehumidifying member 204a. Similarly, the second dehumidifying unit 201b includes a second fan 202b, a second heater 203b, and a second dehumidifying member 204b. The CPU 210 controls the switch valves V1 to V4 and the heaters to control dehumidification of air in a vehicle interior 230 performed by the first dehumidifying unit 201a and the second dehumidifying unit 201b and regeneration of the first dehumidifying member 204a and the second dehumidifying member 204b.

A pipe 205 has one end connected to the vehicle interior side and another end that is branched to be connected to the respective switch valves V1 and V3. With this, air from the vehicle interior can be supplied to the respective dehumidifying units. A pipe 208 has one end connected to the vehicle interior side and another end that is branched to be connected to the respective switch valves V2 and V4. With this, air that has passed through the respective dehumidifying units can be supplied to the vehicle interior.

The switch valve V1 is further connected to an outside air introduction pipe 206a for introducing outside air. With the control by the CPU 210, any one of the pipe 205 and the outside air introduction pipe 206a is selectively communicated with the first dehumidifying unit 201a. The switch valve V2 is further connected to an exhaust pipe 207a for exhausting air that has flowed through the first dehumidifying unit 201a. With the control by the CPU 210, any one of the exhaust pipe 207a and the pipe 208 is selectively communicated with the first dehumidifying unit 201a.

Similarly, the switch valve V3 is further connected to an outside air introduction pipe 206b for introducing outside air. With the control by the CPU 210, any one of the pipe 205 and the outside air introduction pipe 206b is selectively communicated with the second dehumidifying unit 201b. The switch valve V4 is further connected to an exhaust pipe 207b for exhausting air that has flowed through the second dehumidifying unit 201b. With the control by the CPU 210, at least one of the exhaust pipe 207b and the pipe 208 is selectively communicated with the second dehumidifying unit 201b.

In this embodiment, the CPU 210 controls the fans 202a and 202b and the switch valves V1 to V4, which constitute the blower unit.

Figure 11:
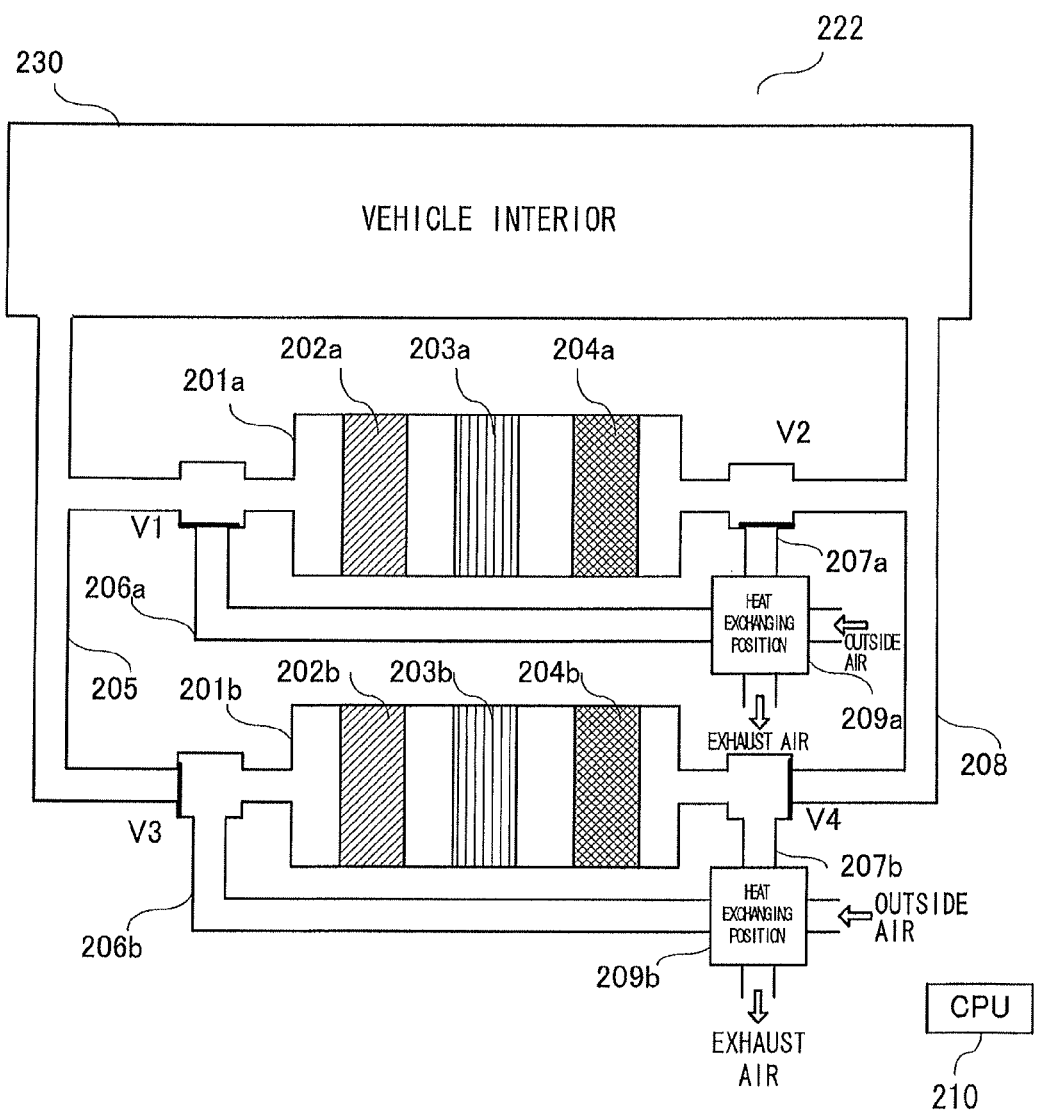
FIG. 11 is an explanatory diagram of a first operation mode of the dehumidifying device for a vehicle according to the third embodiment.

Next, an operation of the dehumidifying system executed by control of the CPU 210 is described with reference to FIG. 11.

(1) First Operation Mode

In a first operation mode, dehumidification is performed at the first dehumidifying unit 201a and regeneration of the dehumidifying member 204b is performed at the second dehumidifying unit 201b.

In the first dehumidifying unit 201a, with the control by the CPU 210, the fan 202a is driven. As illustrated in FIG. 11, the switch valve V1 causes the inflow portion of the first dehumidifying unit 201a to communicate with the pipe 205 extending from the vehicle interior and interrupts communication of the inflow portion with the outside air introduction pipe 206a. Further, the switch valve V2 causes the outflow portion of the first dehumidifying unit 201a to communicate with the pipe 208 extending into the vehicle interior and interrupts communication of the inflow portion with the exhaust pipe 207a. With such a control, air from the vehicle interior is dehumidified by the dehumidifying member 204a in the first dehumidifying unit 201a, and is supplied to the vehicle interior through the pipe 208.

Further, in the second dehumidifying unit 201b, with the control by the CPU 210, the fan 202b is driven. As illustrated in FIG. 11, the switch valve V3 interrupts communication of the inflow portion of the second dehumidifying unit 201b with the pipe 205 extending from the vehicle interior and causes the inflow portion to communicate with the outside air introduction pipe 206b, to thereby achieve a heating state of the heater 203b. Further, the switch valve V4 interrupts communication of the outflow portion of the second dehumidifying unit 201b with the pipe 208 extending into the vehicle interior and causes the outflow portion to communicate with the exhaust pipe 207b. With such a control, communication of the second dehumidifying unit 201b with the air from the vehicle interior is interrupted, and outside air is introduced through the outside air introduction pipe 206b and heated by the heater 203b, to thereby regenerate the dehumidifying member 204b. Air in the second dehumidifying unit 201b, which has passed through the dehumidifying member 204b to increase its humidity, is exhausted through the exhaust pipe 207b. It is preferred that, as illustrated in FIG. 10, etc., a heat exchanger 209b be provided so that heat is exchanged between air to be exhausted and outside air introduced into the second dehumidifying unit 201b to heat air. In this manner, power consumption of the heater 203b for heating air is reduced for efficiency.

(2) Second Operation Mode

In a second operation mode, dehumidification is performed at the second dehumidifying unit 201b and regeneration of the dehumidifying member 204a is performed at the first dehumidifying unit 201a.

Figure 12:
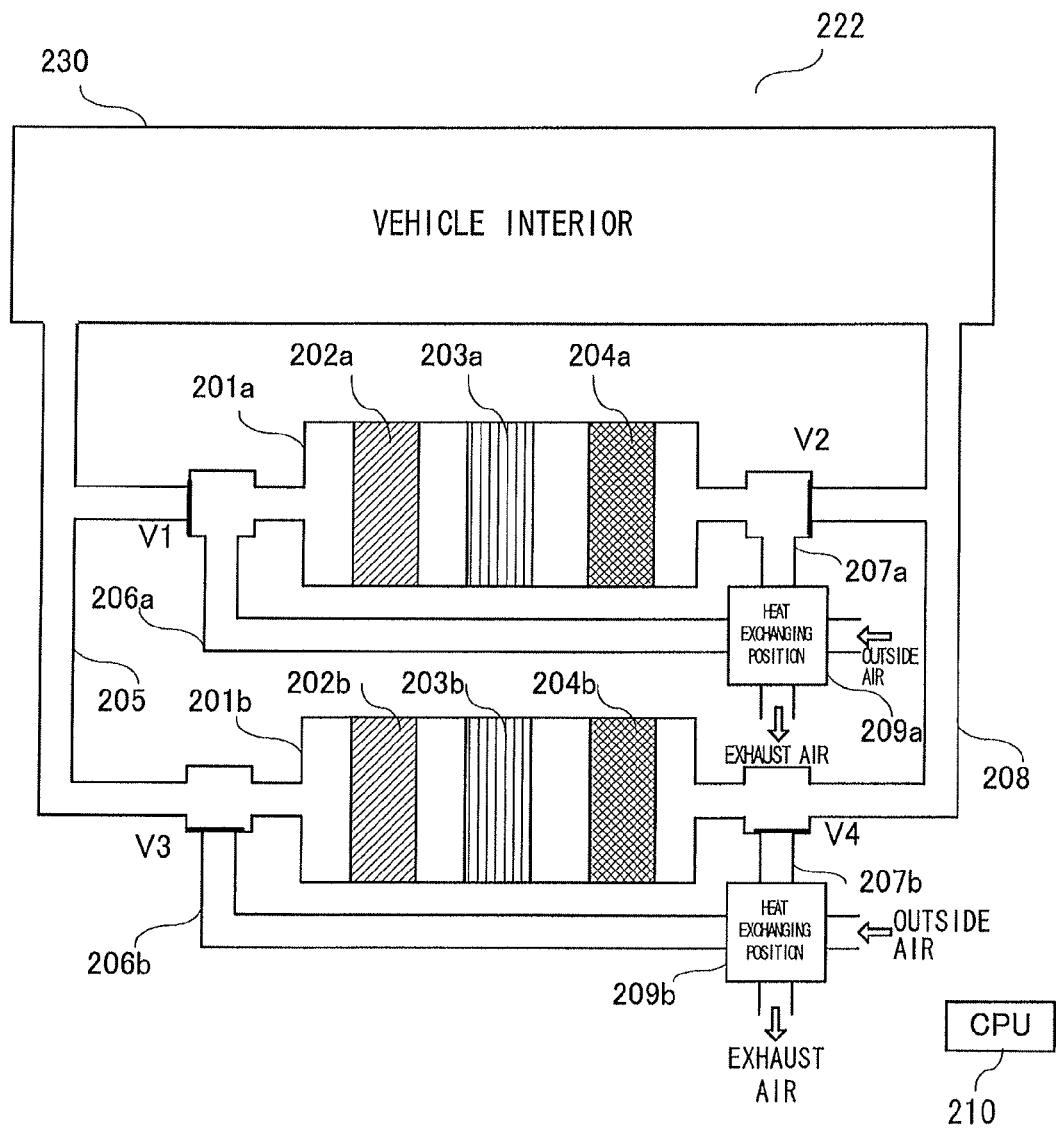
FIG. 12 is an explanatory diagram of a second operation mode of the dehumidifying device for a vehicle according to the third embodiment.

In the second dehumidifying unit 201b, with the control by the CPU 210, the fan 202b is driven. As illustrated in FIG. 12, the switch valve V3 causes the inflow portion of the second dehumidifying unit 201b to communicate with the pipe 205 extending from the vehicle interior and interrupts communication of the inflow portion with the outside air introduction pipe 206b. Further, the switch valve V4 causes the outflow portion of the second dehumidifying unit 201b to communicate with the pipe 208 extending into the vehicle interior and interrupts communication of the inflow portion with the exhaust pipe 207b. With such a control, air from the vehicle interior is dehumidified by the dehumidifying member 204b in the second dehumidifying unit 201b, and is supplied to the vehicle interior through the pipe 208.

Further, in the first dehumidifying unit 201a, with the control by the CPU 210, the fan 202a is driven. As illustrated in FIG. 12, the switch valve V1 interrupts communication of the inflow portion of the first dehumidifying unit 201a with the pipe 205 extending from the vehicle interior and causes the inflow portion to communicate with the outside air introduction pipe 206a, to thereby achieve a heating state of the heater 203a. Further, the switch valve v2 interrupts communication of the outflow portion of the first dehumidifying unit 201a with the pipe 208 extending into the vehicle interior and causes the outflow portion to communicate with the exhaust pipe 207a. With such a control, communication of the first dehumidifying unit 201a with the air from the vehicle interior is interrupted, and outside air is introduced through the outside air introduction pipe 206a and heated by the heater 203a, to thereby regenerate the dehumidifying member 204a. Air in the first dehumidifying unit 201a, which has passed through the dehumidifying member 204a to increase its humidity, is exhausted through the exhaust pipe 207a. It is preferred that, as illustrated in FIG. 10, etc., a heat exchanger 209a be provided so that heat is exchanged between air to be exhausted and outside air introduced into the first dehumidifying unit 201a to heat air. In this manner, power consumption of the heater 203a for heating air is reduced for efficiency.

(3) Third Operation Mode

In a third operation mode, both of the first dehumidifying unit 201a and the second dehumidifying unit 201b perform the dehumidifying operation. Although not essential, the third operation mode can be executed between the first operation mode and the second operation mode. In a case where a moisture absorption time period, which is a time period during which the dehumidifying member can maintain a sufficient moisture absorbing effect to perform dehumidification of the vehicle interior air, is long and a regeneration time period, which is a time period required for regenerating the dehumidifying member by removing moisture from the dehumidifying member, is short, the third operation mode is executed to improve the dehumidification performance. For example, in case where, during first mode operation, the regeneration of the second dehumidifying member 204b of the second dehumidifying unit 201b is completed during the dehumidifying operation of the first dehumidifying unit 201a, and further the moisture absorbing effect of the first dehumidifying member 204a is sufficiently high, instead of directly proceeding to the second operation mode, the third operation mode may be executed and then the process may proceed to the second operation mode.

Figure 13:
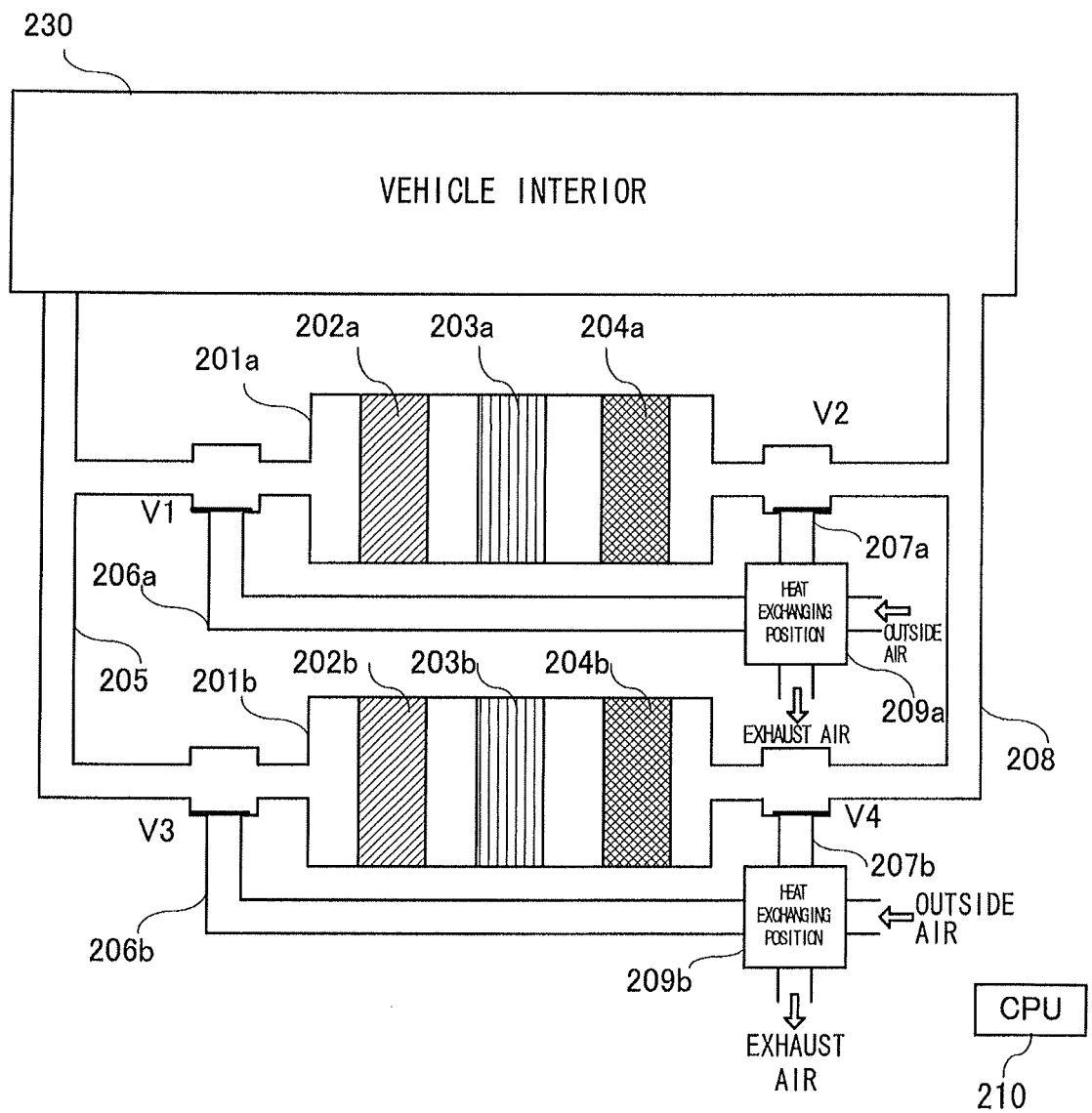
FIG. 13 is an explanatory diagram of a third operation mode of the dehumidifying device for a vehicle according to the third embodiment.

With reference to FIG. 13, the third operation mode is described below.

In the first dehumidifying unit 201a, with the control by the CPU 210, the fan 202a is driven. As illustrated in FIG. 13, the switch valve V1 causes the inflow portion of the first dehumidifying unit 201a to communicate with the pipe 205 extending from the vehicle interior and interrupts communication of the inflow portion with the outside air introduction pipe 206a. Further, the switch valve V2 causes the outflow portion of the first dehumidifying unit 201a to communicate with the pipe 208 extending into the vehicle interior and interrupts communication of the inflow portion with the exhaust pipe 207a. With such a control, air from the vehicle interior is dehumidified by the dehumidifying member 204a in the first dehumidifying unit 201a, and is supplied to the vehicle interior through the pipe 208.

Further, in the second dehumidifying unit 201b, with the control by the CPU 210, the fan 202b is driven. As illustrated in FIG. 13, the switch valve V3 causes the inflow portion of the second dehumidifying unit 201b to communicate with the pipe 205 extending from the vehicle interior and interrupts communication of the inflow portion with the outside air introduction pipe 206b. Further, the switch valve V4 causes the outflow portion of the second dehumidifying unit 201b to communicate with the pipe 208 extending into the vehicle interior and interrupts communication of the outflow portion with the exhaust pipe 207b. With such a control, air from the vehicle interior is dehumidified by the dehumidifying member 204b in the second dehumidifying unit 201b, and supplied to the vehicle interior through the pipe 208.

As described above, in the third operation mode, both of the first dehumidifying unit 201a and the second dehumidifying unit 201b perform dehumidification. FIGS. 14a to 14c are explanatory diagrams illustrating switching timings among the first to third operation modes.

FIG. 14a illustrates an example of switching between the first operation mode and the second operation mode controlled by the CPU 210. In this example, in an initial state, the first operation mode in which the first dehumidifying unit 201a performs dehumidification and the second dehumidifying unit 201b performs regeneration of the dehumidifying member 204b is executed. After that, at a time point T1, the operation mode is immediately switched to the second operation mode in which the first dehumidifying unit 201a performs regeneration of the dehumidifying member 204a and the second dehumidifying unit 201b performs dehumidification. After that, at a time point T2, the operation mode is switched to the first operation mode again to return to the initial state. The above-mentioned operation is repeated thereafter.

Therefore, in the example of FIG. 14a, operation is performed in a manner that the first operation mode and the second operation mode are alternately switched.

FIG. 14b illustrates an example in which the regeneration time period is reduced and the dehumidifying operation time period and the regenerating operation time period are operated at a ratio of 2:1. In this example, in the initial state, similarly to the example of FIG. 14a, the first operation mode is executed. At the time point T1, however, the regeneration of the second dehumidifying unit 201b is completed, and the third operation mode in which both of the first dehumidifying unit 201a and the second dehumidifying unit 201b perform the dehumidifying operation is executed. At the time point T2, the dehumidifying operation time period of the first dehumidifying unit 201a is ended and the operation thereof is switched to the regenerating operation of the dehumidifying member 204a, but the second dehumidifying unit 201b still maintains the dehumidifying operation. Therefore, the operation mode is switched to the second operation mode. At a time point T3, the regeneration of the first dehumidifying unit 201a is completed and the operation thereof is switched to the dehumidifying operation, and the dehumidification of the second dehumidifying unit 201b is completed and the operation thereof is switched to the regenerating operation. Therefore, the operation mode is switched to the first operation mode to return to the initial state. The above-mentioned operation is repeated thereafter.

Therefore, in the example of FIG. 14b, the following cycle is repeated. The operation mode is sequentially switched in the order of the first operation mode, the third operation mode, and the second operation mode, and then returns again to the first operation as the initial state.

In the example of FIG. 14b, simultaneously when the first dehumidifying unit 201a switches from the regenerating operation to the dehumidifying operation, the second dehumidifying unit 201b switches from the dehumidifying operation to the regenerating operation, but those operations may be switched at different timings. This example is illustrated in FIG. 14c.

In the initial state of FIG. 14c, the third operation mode in which both of the first dehumidifying unit 201a and the second dehumidifying unit 201b perform the dehumidifying operation is executed. After that, at T1, only the second dehumidifying unit 201b switches to the regenerating operation, and thus the first operation mode is executed. After that, at the time point T2, the second dehumidifying unit 201b switches to the dehumidifying operation, while the first dehumidifying unit 201a maintains the dehumidifying operation. Therefore, the third operation mode is executed. At the time point T3, only the first dehumidifying unit 201a switches to the regenerating operation, and the second dehumidifying unit 201b maintains the dehumidifying operation. Therefore, the second operation mode is executed. At a time point T4, the first dehumidifying unit 201a switches to the dehumidifying operation, and the second dehumidifying unit 201b maintains the dehumidifying operation. Therefore, the third operation mode is executed, and the operation returns to the initial state. The above-mentioned operation is repeated thereafter.

Therefore, in the example of FIG. 14c, the following cycle is repeated. The operation mode is switched in the order of the third operation mode, the first operation mode, the third operation mode, and the second operation mode, and then returns again to the third operation mode as the initial state.

The examples of FIGS. 14b and 14c are particularly suitable for a case where less regeneration time period is required for the dehumidifying member. For example, a polymer sorbent based dehumidifying member has a feature in that its regeneration time period is shorter than that of a zeolite based dehumidifying member. Therefore, the polymer sorbent based dehumidifying member is particularly suitable for the examples of FIGS. 14b and 14c.

Note that, in FIGS. 14a to 14c, the dehumidifying operation time period and the regeneration time period are fixed to preset values, which are common in both of the first dehumidifying unit 201a and the second dehumidifying unit 201b. However, the dehumidifying operation time period and the regeneration time period need not be fixed to predetermined values, and may be determined by an arbitrary method. For example, the dehumidification performance of each of the first dehumidifying unit 201a and the second dehumidifying unit 201b and the degree of regeneration of each of the dehumidifying members 204a and 204b may be measured at real time to determine the dehumidifying operation time period and the regeneration time period at real time.

For example, as illustrated in FIG. 10, thermometers T1 and T2 may be arranged at the respective inflow portion and outflow portion of the first dehumidifying unit 201a to measure the temperature rise due to condensation heat of water vapor absorbed by the dehumidifying member 204a in the first dehumidifying unit 201a. In this manner, the change in humidity of air inside the first dehumidifying unit 201a can be measured. A large temperature increase value represents that the dehumidification effect by the dehumidifying member 204a is maintained high. On the other hand, a small temperature increase value represents that the dehumidification effect by the dehumidifying member 204a is reduced. No temperature change represents that no dehumidification effect is obtained by the dehumidifying member 204a. With this, for example, when the value of temperature increase between T1 and T2 is smaller than a certain value, the CPU 210 can control the first dehumidifying unit 201a so as to switch to the regenerating operation. Note that, also in the second dehumidifying unit 201b, thermometers T3 and T4 may be arranged to respective inflow portion and outflow portion thereof. In this manner, similarly, the value of temperature increase due to the dehumidification effect by the dehumidifying member 204b can be measured, to thereby control switching to the regenerating operation.

Figure 15:
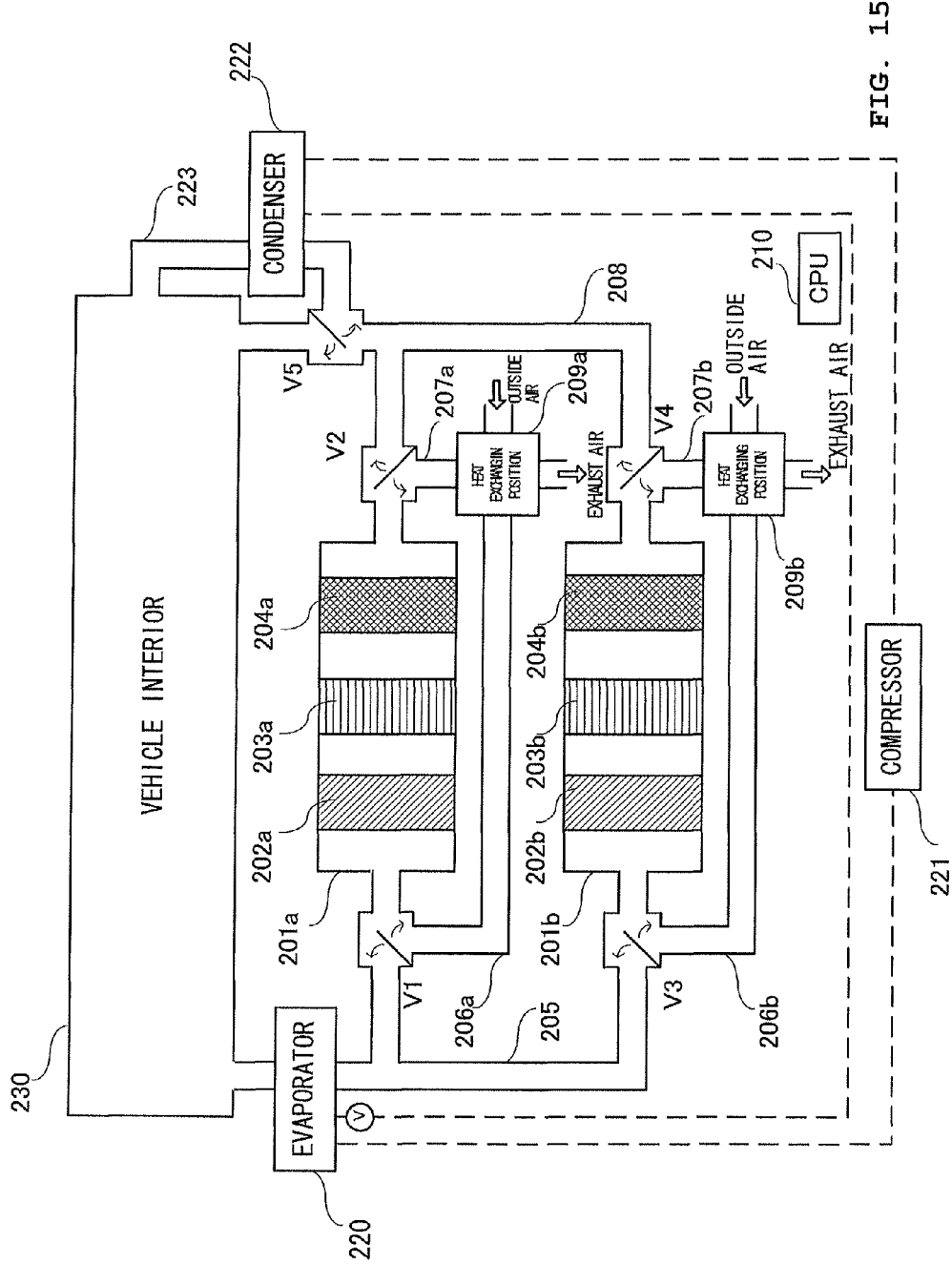
FIG. 15 is a schematic configuration diagram of a dehumidifying device utilizing an in-vehicle HVAC device.
Figure 16:
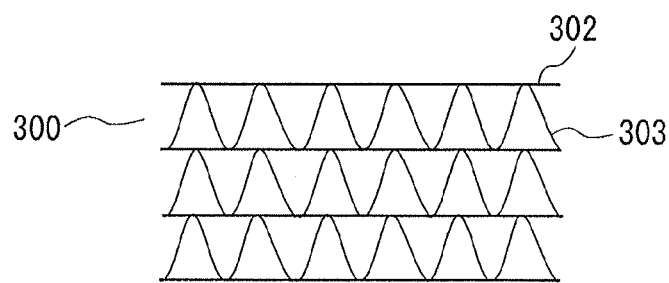
FIG. 16 is an explanatory diagram of a planar dehumidifying agent carrier.

FIG. 15 is a schematic configuration diagram of a dehumidifying device utilizing an in-vehicle HVAC device. In this example, the first heat exchanger 209a provided to the first dehumidifying unit 201a, the second heat exchanger 209b provided to the second dehumidifying unit, an evaporator 220 provided to an outflow portion of air from the vehicle interior, a compressor 221, a switch valve V5 provided on the vehicle interior 230 side of the pipe 208, a pipe 223 connecting between the switch valve and the vehicle interior 230, and a condenser 222 provided to the pipe 223 are used together to perform dehumidification more efficiently. Note that, the evaporator, the compressor, and the condenser of the in-vehicle HVAC device for performing air conditioning of the vehicle interior 230 may be arranged so as to be doubled as the evaporator 220, the compressor 221, and the condenser 222 in FIG. 15, respectively. In this manner, cooling, heating, and dehumidification of the vehicle interior can be performed.

First, the temperature of air supplied from the vehicle interior 230 is decreased and the relative humidity thereof is increased by performing heat exchange at the evaporator 220. Under this state, the air is supplied to the first dehumidifying unit 201a and the second dehumidifying unit 201b. Thus, the dehumidification efficiency is increased. As represented in the first embodiment and the second embodiment, the dehumidification efficiency becomes higher as the relative humidity of air to be supplied to the dehumidifying member becomes higher. Therefore, this configuration is advantageous to improvement in dehumidification efficiency.

In a case where a cooling operation is performed in summer or the like, in which the air from the vehicle interior is cooled and then returned to the vehicle interior, the CPU 210 controls the valve V5 so that air returning to the vehicle interior 230 through the pipe 208 returns directly to the vehicle interior 230 without passing through the pipe 223 to the condenser 222.

On the other hand, in a case where a heating operation is performed in winter or the like, in which the air from the vehicle interior is heated and then returned to the vehicle interior, the CPU 210 interrupts the flow path of directly returning to the vehicle interior, and causes the pipe 208 to communicate with the pipe 223 to which the condenser 222 is provided. In this manner, air returning to the vehicle interior 230 is heated via the condenser 222 and is then returned to the vehicle interior 230.

Note that, in the above-mentioned respective examples, the fans 202a and 202b provided to the first dehumidifying unit 201a and the second dehumidifying unit 201b, respectively, are driven in both of the dehumidifying operation and the regenerating operation. Alternatively, a fan dedicated to blowing air to the dehumidifying units may be provided at the position of the evaporator 202. During dehumidification, the first fan 202a of the first dehumidifying unit 201a and the second fan 202b of the second dehumidifying unit 201b may be stopped, and the first fan 202a and the second fan 202b may be driven only during regeneration of the dehumidifying members.

Fourth Embodiment

In this embodiment, a deformable dehumidifying member that is suitably applicable also to the above-mentioned first to third embodiments is described.

Figure 17:
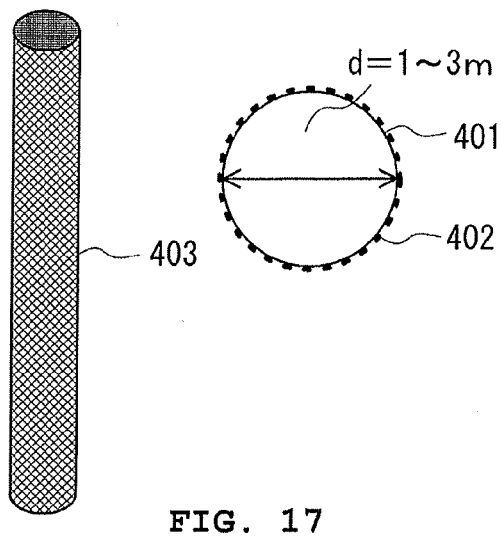
FIG. 17 is a schematic view of a tubular body and a carrier according to a fourth embodiment of the present invention.
Figure 18:
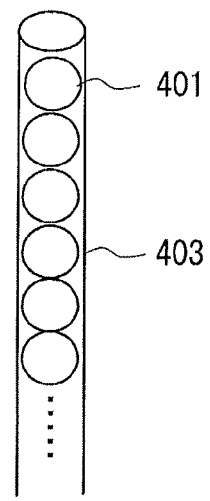
FIG. 18 is an explanatory diagram of a state in which the carriers are arranged inside the tubular body according to the fourth embodiment.

In this embodiment, as illustrated in FIG. 17, granular carriers 401 each carrying a dehumidifying agent 402 on its surface and having a diameter of about 1 to 3 mm, and a mesh tubular body 403 for incorporating the carriers 401 are prepared. Then, as illustrated in a schematic view of FIG. 18 illustrating a state in which the carriers 401 are arranged inside the tubular body 403, the carriers 401 are retained in one row inside the tubular body 403. Note that, in this embodiment, the granular carrier has a sphere shape, but as long as air flow for dehumidification is possible, shapes other than a sphere may be employed. Further, the grain size is only required to be a size that enables air flow for dehumidification. The diameter is preferably 0.01 to 50 mm, more preferably 0.05 to 10 mm, further preferably 1 to 3 mm. In this embodiment, the diameter of the sphere particle is set to 2 mm.

Further, the tubular body 403 is made of a material having air permeability that enables the dehumidification and regeneration of the dehumidifying agent, and having heat resistance so that air heated during regeneration can flow therethrough. It is preferred that the tubular body be flexible. In this case, the entirety of a dehumidifying member to be obtained can be formed flexible. In this embodiment, the tubular body 403 is made of flexible synthetic fiber that has heat resistance to withstand heating during regeneration.

In the example of FIG. 18, inside the tubular body 403, the carriers 401 are arranged in one row in the longitudinal direction. Further, in order to prevent leakage of the granular carriers, the upper portion and the lower portion of the tubular body incorporating the carriers are also covered with mesh. Alternatively, the upper end and the lower end of the tubular body 403 may be simply bound to prevent leakage of the carriers.

Figure 19:
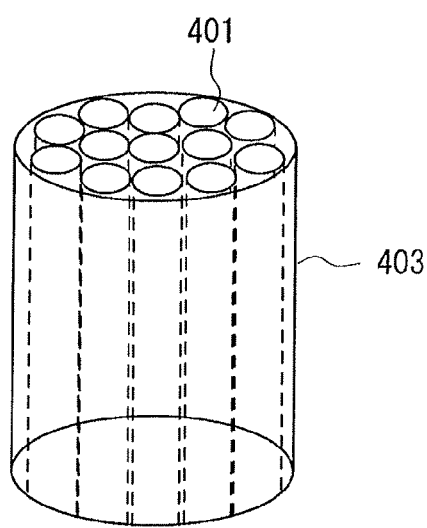
FIG. 19 is an explanatory diagram of a state in which a plurality of tubular bodies are movably arranged inside a holder.

FIG. 19 is an explanatory diagram illustrating a state in which a plurality of tubular bodies 403 are arranged inside a holder 404 in a manner that the plurality of tubular bodies 403 are movable. As illustrated in FIG. 19, a container having ventilation property is used as the holder 404, and the carriers 403 are arranged so as to be incorporated in the holder 404. In this manner, the dehumidifying member 410 is formed. Further, in this embodiment, the holder 404 has air permeability that enables the dehumidification and regeneration, and is also resistant to heat during regeneration. Further, the holder 404 is flexible and deformable in accordance with the movement and deformation of the tubular bodies 403.

Further, the tubular bodies 403 are not fixed to each other but movable inside the holder 404. Further, the holder 404 is provided in a large size so that a gap is formed for movement of the tubular bodies 403.

Figure 20:
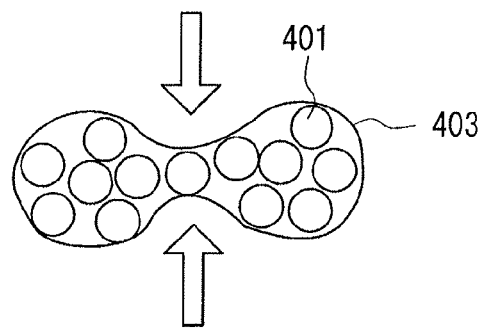
FIG. 20 is an explanatory diagram of a deformation state when an external force is applied to the holder.

With this, as illustrated in FIG. 20, the shape of the holder 404 can change when force is applied to the holder 404 in the directions of arrows. Note that, the holder 404 is made of the same material as the tubular body 403. Further, in order to prevent leakage of the tubular bodies 403 from the holder 404, the upper portion and the lower portion of the holder 404 are also covered with mesh. Similarly to the case of the tubular body 403, the upper end and the lower end of the holder 404 may be simply bound to prevent leakage of the tubular bodies 403.

With such a configuration, in the dehumidifying member 410 of this embodiment, the air flow that enables dehumidification and regeneration is secured. Further, the dehumidifying member 410 has heat resistance so that air heated during regeneration can flow therethrough. Further, the tubular bodies 403 are movable inside the holder 404, and hence the degree of freedom in deformation is high. Therefore, the dehumidifying member 410 can be arranged along a portion with irregularities and a curved wall, or in a space that is incapable of securing enough height or thickness, such as a door of the automobile. Thus, the degree of freedom of arrangement in the dehumidifying member 410 is improved. Further, in this embodiment, the tubular body 403 and the holder 404 are made of a flexible material. Therefore, the dehumidifying member 410 is not only deformable due to the movement of the tubular bodies 403, but also deformable due to deformation of the tubular body 403 itself and deformation of the holder 404 itself. Thus, the degree of freedom in deformation is further improved.

Note that, in this embodiment, as illustrated in FIG. 18, the carriers 401 are arranged inside the tubular body 403 in one row along the longitudinal direction. However, if sufficient air flow to enable dehumidification can be secured, the carriers 401 may be arranged inside the tubular body 403 in two rows or more. Further, if sufficient air flow to enable dehumidification can be secured, instead of the tubular body 403, a tetrahedral, hexahedral, or spherical bag member may be used to incorporate the carriers 401 in the bag member.

Further, as the material of the carrier, for example, an alumina particle is suitable. As the material of the mesh tubular body 403 and holder 404, for example, a stainless mesh tube is suitable. As a matter of course, the tubular body 403 and the holder 404 may be made of different materials. As the dehumidifying agent, for example, a polymer sorbent is suitable. Those materials are used in this embodiment.

REFERENCE SIGNS LIST

1 . . . dehumidifying unit
2 . . . dehumidifying member
3 . . . heating unit
4 . . . blower unit (fan)
5a, 5b, 5c, 5d . . . flow path
5e . . . bypass ventilation unit (bypass duct)
6a . . . duct for anti-fogging nozzle
6b . . . jetting unit (anti-fogging nozzle)
7 . . . exhaust duct
8 . . . flow path switching unit
8a . . . switching valve
9 . . . heat exchanging unit
10 . . . windshield
12 . . . control device
41 . . . temperature detection unit
42 . . . temperature detection unit
101 . . . compressor
102 . . . evaporator
103 . . . dehumidifying member
104a . . . first blower unit (fan)
104b . . . second blower unit (fan)
105 . . . condenser
106 . . . expansion valve
108a . . . first flow path switching unit
108b . . . second flow path switching unit
108c . . . third flow path switching unit
108d . . . fourth flow path switching unit
113 . . . first exhaust duct
114 . . . outside air introduction duct
115 . . . vehicle interior air reflux duct
116 . . . vehicle interior air intake duct
117 . . . second exhaust duct
140 . . . electric heating unit (electric heater)
150 . . . temperature measurement unit
201a, b . . . dehumidifying unit
202a, b . . . fan
203a, b . . . heater
204a, b . . . dehumidifying member
205, 208, 223 . . . pipe
206a, b . . . outside air introduction pipe
207a, b . . . exhaust pipe 209a, b . . . heat exchanger
220 . . . evaporator
221 . . . compressor
222 . . . condenser
230 . . . vehicle interior
401 . . . carrier
402 . . . dehumidifying agent
403 . . . tubular body
404 . . . holder
410 . . . dehumidifying member

The invention claimed is:

1. An HVAC device for a vehicle that performs air conditioning and operates using stored electric power as a power source, the HVAC device comprising:
a compressor;
a first blower disposed along ventilation pipes for taking in interior air of the vehicle through a vehicle interior air intake duct in communication with the first blower;
an evaporator and dehumidifying member disposed along the ventilation pipes and in communication with the first blower;
a condenser and an electrical heating unit disposed along the ventilation pipes and in communication with the first blower;
a vehicle interior air reflux duct disposed along the ventilation pipes and in communication with first blower and the interior of the vehicle;
a second blower disposed along the ventilation pipes for taking in air outside of the vehicle through an outside air introduction duct; and
a first exhaust duct and a second exhaust duct disposed along the ventilation pipes and in communication with the second blower;
wherein the HVAC device includes a heating and dehumidifying operation mode and actuation of the compressor and first blower creates a first flow path introducing interior air of the vehicle via the vehicle interior air intake duct, supplying the interior air of the vehicle to the evaporator and dehumidifying member, to the condenser, to the electric heating unit, and back to the vehicle interior via the vehicle interior air reflux duct;
wherein the HVAC device includes a regenerating operation mode and actuation of the compressor and the second blower creates a second flow path introducing outside air via the outside air introduction duct, supplying the outside air to the electric heating unit and the condenser, the evaporator and dehumidifying member, and exhausting the outside air from the vehicle via the first exhaust duct;
wherein the HVAC device includes a cooling and dehumidifying operation mode and actuation of the compressor and actuation of the first blower creates a third flow path introducing interior air of the vehicle via the vehicle interior air intake duct, supplying the interior air of the vehicle to the evaporator and the dehumidifying member, and back to the vehicle interior via the vehicle interior air reflux duct; and
wherein the HVAC device includes the cooling and dehumidifying operation mode and actuation of the second blower creates a fourth flow path introducing outside air via the outside air introduction duct to the condenser and to the second exhaust duct to be exhausted outside the vehicle.

2. The HVAC device of claim 1, wherein the dehumidifying member carries a dehumidifying agent that includes a polymer sorbent.

3. The HVAC device of claim 1, further comprising a control unit in communication with a temperature measurement unit, wherein based on measurement results of the temperature measurement unit, the control unit adjust the operation and stoppage of the compressor, the first blower, the second blower, and the electric heating unit.

* * * * *